US011844029B2

(12) United States Patent
Nguyen et al.

(10) Patent No.: US 11,844,029 B2
(45) Date of Patent: Dec. 12, 2023

(54) PATH LOSS ESTIMATION

(71) Applicant: QUALCOMM Incorporated, San Diego, CA (US)

(72) Inventors: Tien Viet Nguyen, Bridgewater, NJ (US); Sudhir Kumar Baghel, Pleasanton, CA (US); Kapil Gulati, Belle Mead, NJ (US); Arjun Bharadwaj, Cupertino, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/957,711

(22) Filed: Sep. 30, 2022

(65) Prior Publication Data

US 2023/0025569 A1 Jan. 26, 2023

Related U.S. Application Data

(63) Continuation of application No. 16/737,807, filed on Jan. 8, 2020, now Pat. No. 11,463,963.

(Continued)

(51) Int. Cl.
*H04W 52/24* (2009.01)
*H04W 52/28* (2009.01)

(52) U.S. Cl.
CPC ....... *H04W 52/242* (2013.01); *H04W 52/245* (2013.01); *H04W 52/283* (2013.01)

(58) Field of Classification Search
CPC ........... H04W 52/242; H04W 52/0245; H04W 52/283
See application file for complete search history.

(56) References Cited

U.S. PATENT DOCUMENTS

| 2008/0055068 | A1  | 3/2008 | Van Wageningen et al. |
|---|---|---|---|
| 2013/0229930 | A1* | 9/2013 | Akay ............ H04W 12/64 370/252 |

(Continued)

FOREIGN PATENT DOCUMENTS

| CN | 1462515 A   | 12/2003 |
|---|---|---|
| CN | 103314621 A | 9/2013 |

(Continued)

OTHER PUBLICATIONS

3GPP: "3rd Generation Partnership Project, Technical Specification Group Radio Access Network; Evolved Universal Terrestrial Radio Access (E-UTRA), Physical layer procedures (Release 15)", 3GPP Standard, Technical Specification, 3GPP TS 36.213. 3rd Generation Partnership Project (3GPP), Mobile Competence Centre, 650, Route Des Lucioles, F-06921 Sophia-Antipolis Cedex, France, vol. RAN WG1, No. V15.3.0. Oct. 1, 2018 (Oct. 1, 2018). 547 Pages, XP051487502, [retrieved on Oct. 1, 2018] Section 5 .1.1.1, pp. 1-56, 8-58, 491-506.

(Continued)

*Primary Examiner* — Keith Ferguson
(74) *Attorney, Agent, or Firm* — Holland & Hart LLP

(57) ABSTRACT

Methods, systems, and devices for wireless communications are described. Examples may include a receiving wireless device located in a first geographic zone receiving multiple signals from one or more transmitting wireless devices. The receiving wireless device may determine based on the received signals that the one or more transmitting devices are located in a second geographic zone. The receiving wireless device may determine configured transmit power information for each of the signals received from the transmitting wireless devices located in the second geographic zone. The receiving wireless device may estimate a path loss of wireless communications between the first geographic zone and the second geographic zone based on the config- (Continued)

ured transmit powers received in the signals. The receiving wireless device may communicate within the second geographic location based on the estimated path loss between the first geographic region and the second geographic region.

20 Claims, 12 Drawing Sheets

Related U.S. Application Data

(60) Provisional application No. 62/790,761, filed on Jan. 10, 2019.

(56) References Cited

U.S. PATENT DOCUMENTS

| | | |
|---|---|---|
| 2014/0064116 A1 | 3/2014 | Linde et al. |
| 2014/0372774 A1 | 12/2014 | Li et al. |
| 2016/0189543 A1 | 6/2016 | Altintas et al. |
| 2016/0198449 A1 | 7/2016 | Nagata et al. |
| 2017/0150314 A1 | 5/2017 | Hwang et al. |
| 2020/0163135 A1 | 5/2020 | Yang et al. |
| 2020/0229106 A1 | 7/2020 | Nguyen et al. |

FOREIGN PATENT DOCUMENTS

| | | | |
|---|---|---|---|
| CN | 103609155 A | 2/2014 | |
| CN | 103650394 A | 3/2014 | |
| CN | 105075320 A | 11/2015 | |
| CN | 108632973 A | 10/2018 | |
| JP | 2009009219 A | * 1/2009 | |
| WO | WO-2017139206 A1 | * 8/2017 | ............ H04W 16/14 |
| WO | WO-2018175784 A1 | 9/2018 | |

OTHER PUBLICATIONS

International Search Report and Written Opinion—PCT/US2020/012947—ISA/EPO—dated Apr. 3, 2020.
International Preliminary Report on Patentability—PCT/US2020/012947, The International Bureau of WIPO—Geneva, Switzerland, dated Jul. 22, 2021.

* cited by examiner

PATH LOSS ESTIMATION

CROSS REFERENCE

The present application for patent is a continuation of U.S. patent application Ser. No. 16/737,807 by NGUYEN et al., entitled "PATH LOSS ESTIMATION" filed Jan. 8, 2020, which claims the benefit of U.S. Provisional Patent Application No. 62/790,761 by NGUYEN, et al., entitled "PATH LOSS ESTIMATION," filed Jan. 10, 2019, each of which are assigned to the assignee hereof, and each of which are expressly incorporated herein.

BACKGROUND

The following relates generally to wireless communications, and more specifically to path loss estimation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Various types of wireless devices may send and receive communications in a peer to peer system. In some cases, for example in multicast or broadcast procedures, a first wireless device may prepare to send a communication from its current geographic location to one or more wireless devices located in a target geographic location (e.g., a different geographic region). To ensure that the communication reaches the wireless devices in the target geographic region, the first wireless device may transmit the communication at full or high power. As such, the communication may reach other, non-target regions, thereby increasing interference, reducing spatial reuse, or both.

SUMMARY

The described techniques relate to improved methods, systems, devices, and apparatuses that support path loss estimation. Generally, the described techniques provide for estimating a path loss between a first geographic zone and a second geographic zone based on a wireless device located in the first geographic zone receiving multiple wireless transmissions from one or more wireless devices located in the second geographic zone. The wireless transmissions may include geographic zone information (e.g., a zone indicator) as well as configured transmit power information. The receiving wireless device may determine received power information for each wireless transmission that the receiving wireless device receives from the second zone. In some aspects, the receiving wireless device may estimate the path loss between the first geographic zone and the second geographic zone based on comparing configured transmit power for each wireless transmission with measured received power for that transmission. The estimated path loss may be calculated or refined based on receiving multiple signals transmitted from one or more wireless devices from the second zone. This may include averaging multiple signals, filtering, outlier analysis, other statistical analysis, or the like, or a combination thereof. The receiving wireless device or another wireless device located in the first geographic zone may configure their transmissions to the second geographic zone based on the estimated path loss.

A method of wireless communications is described. The method may include receiving, at a receiving wireless device in a first geographic zone, a set of signals from one or more transmitting wireless devices, determining (e.g., identifying), based on the set of signals, that the one or more transmitting wireless devices are in a second geographic zone, determining (e.g., identifying) configured transmit power information for each of the set of signals from the one or more transmitting wireless devices that are in the second geographic zone, estimating a path loss of wireless communications between the first geographic zone and the second geographic zone based on the configured transmit power information, and communicating (e.g., transmitting at least one signal) within at least a portion of the second geographic zone based on the estimated path loss.

An apparatus for wireless communications is described. The apparatus may include a processor, memory in electronic communication with the processor, and instructions stored in the memory. The instructions may be executable by the processor to cause the apparatus to receive, at a receiving wireless device in a first geographic zone, a set of signals from one or more transmitting wireless devices, determine (e.g., identify), based on the set of signals, that the one or more transmitting wireless devices are in a second geographic zone, determine (e.g., identify) configured transmit power information for each of the set of signals from the one or more transmitting wireless devices that are in the second geographic zone, estimate a path loss of wireless communications between the first geographic zone and the second geographic zone based on the configured transmit power information, and communicate (e.g., transmit at least one signal) within at least a portion of the second geographic zone based on the estimated path loss.

Another apparatus for wireless communications is described. The apparatus may include means for receiving, at a receiving wireless device in a first geographic zone, a set of signals from one or more transmitting wireless devices, determining (e.g., identifying), based on the set of signals, that the one or more transmitting wireless devices are in a second geographic zone, determining (e.g., identifying) configured transmit power information for each of the set of signals from the one or more transmitting wireless devices that are in the second geographic zone, estimating a path loss of wireless communications between the first geographic zone and the second geographic zone based on the configured transmit power information, and communicating (e.g., transmitting at least one signal) within at least a portion of the second geographic zone based on the estimated path loss.

A non-transitory computer-readable medium storing code for wireless communications is described. The code may include instructions executable by a processor to receive, at a receiving wireless device in a first geographic zone, a set of signals from one or more transmitting wireless devices, determine (e.g., identify), based on the set of signals, that the one or more transmitting wireless devices are in a second geographic zone, determine (e.g., identify) configured transmit power information for each of the set of signals from the one or more transmitting wireless devices that are in the second geographic zone, estimate a path loss of wireless communications between the first geographic zone and the second geographic zone based on the configured transmit power information, and communicate (e.g., transmit at least one signal) within at least a portion of the second geographic zone based on the estimated path loss.

A method of wireless communications is described. The method may include determining (e.g., identifying), at a transmitting wireless device, a transmitting zone associated with a geographic location of the transmitting wireless device, configuring a first set of transmit power parameters for a first set of signals to be transmitted from the transmitting wireless device, located in the transmitting zone, to a first set of receiving devices, and transmitting, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof.

An apparatus for wireless communications is described. The apparatus may include a processor, memory in electronic communication with the processor, and instructions stored in the memory. The instructions may be executable by the processor to cause the apparatus to determine (e.g., identify), at a transmitting wireless device, a transmitting zone associated with a geographic location of the transmitting wireless device, configure a first set of transmit power parameters for a first set of signals to be transmitted from the transmitting wireless device, located in the transmitting zone, to a first set of receiving devices, and transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof.

Another apparatus for wireless communications is described. The apparatus may include means for determining (e.g., identifying), at a transmitting wireless device, a transmitting zone associated with a geographic location of the transmitting wireless device, configuring a first set of transmit power parameters for a first set of signals to be transmitted from the transmitting wireless device, located in the transmitting zone, to a first set of receiving devices, and transmitting, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof.

A non-transitory computer-readable medium storing code for wireless communications is described. The code may include instructions executable by a processor to determine (e.g., identify), at a transmitting wireless device, a transmitting zone associated with a geographic location of the transmitting wireless device, configure a first set of transmit power parameters for a first set of signals to be transmitted from the transmitting wireless device, located in the transmitting zone, to a first set of receiving devices, and transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof.

DETAILED DESCRIPTION

Figure 1:
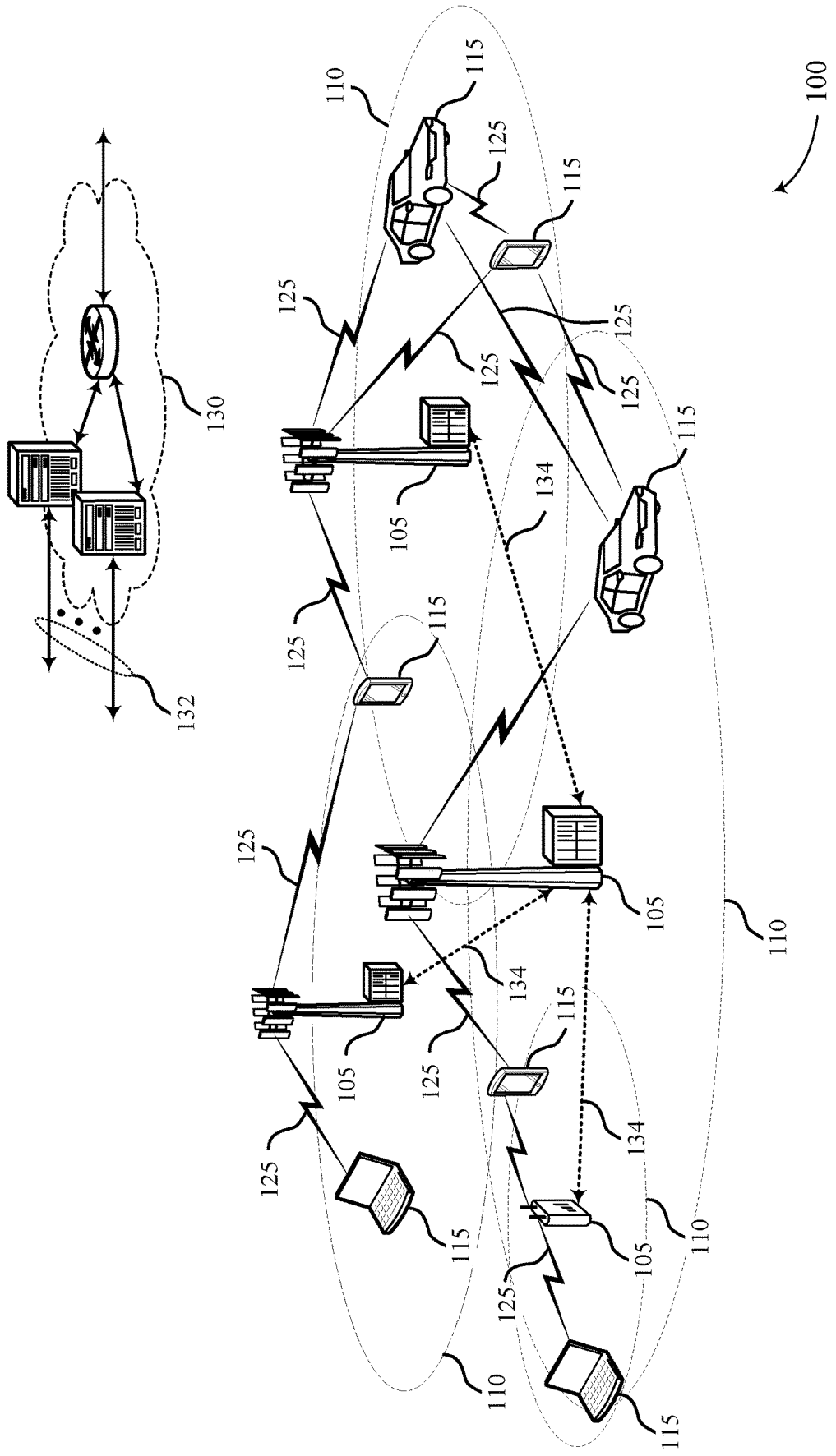
FIG. 1 illustrates an example of a system for wireless communications that supports path loss estimation in accordance with aspects of the present disclosure.

Aspects of the disclosure include a wireless communications system that supports path loss estimation between two or more UEs, for example, UEs located in different geographic zones. The wireless system may include peer to peer communications such as wireless communications between two or more UEs. A first UE may initially receive wireless communications, and thus be referred to as a receiving wireless device. A second UE may initially transmit wireless communications, and thus be referred to as a transmitting wireless device. However, each UE may operate as a receiving UE which estimates a path loss based on received wireless signals from one or more UEs (e.g., located in a different geographic zones), or as a transmitting UE which transmits wireless information to one or more other UEs (e.g., located in geographic zones that the transmitting UE is not currently located in). The receiving wireless device may be located in a first geographic zone and one or more transmitting wireless devices may be located in a second geographic zone.

A receiving wireless device may receive multiple signals from one or more transmitting wireless devices. The one or more transmitting wireless devices may transmit the signals via unicast, multicast, broadcast or similar communications methods. For example, the transmitting wireless devices may be one or more UEs (e.g., vehicle, mobile handset, etc.) operating in a vehicle to everything (V2X) environment. In this scenario, transmitting wireless devices may multicast or broadcast vehicle state information (e.g., vehicle safety state messages) to surrounding wireless devices. The receiving wireless device may be one of these surrounding wireless devices.

To ensure that communications reach an intended receiver, a transmitting wireless device may configure the transmit power for a message at full power or send the message at a transmit power that is much higher than needed to reach the intended UEs. Further, in multicast or broadcast situations, a transmitting wireless device may send wireless communications to multiple receiving devices located at different geographic locations. Therefore, transmission feedback such as control state information (CSI) received from one receiving device may not provide accurate information for other receiving wireless devices. For example, a transmitting wireless device may prepare to send a multicast message to multiple receiving wireless devices located in a similar geographic region. The transmitting wireless device may not be aware of what power to transmit the message at. That is, the transmitting wireless device may not be aware of signal attenuating effects such as those due to path loss, fast fading, shadowing, blocking or the like. As a result, the transmitting wireless device may send the multicast message at full power to increase the chance that the message will be received by the intended receiving wireless devices. However, transmitting one or more messages at full or high power may increase interference with UEs the message is not intended for or is not relevant to. Moreover, higher transmission power has a greater likelihood of being detected by other wireless devices, for example, wireless devices performing a listen before talk (LBT) procedure. Thus, the transmitting wireless device transmitting at high or full power to compensate for not knowing an accurate path loss between the transmitting wireless device and intended receivers results in inefficient use of spectrum resources (e.g., increased interference and/or decreased spatial reuse).

Aspects of the disclosure include determining (e.g., identifying) geographic zones, which may be associated with fixed geographic coordinates (e.g., global positioning system (GPS) coordinates). Each geographic zone may have defined geometric relationships relative to other geographic zones. For example, geographic zones may be bound by polygon regions having a series of defined vertices and edges. As used herein, a geographic zone may include a region that may be identifiable in some manner from another region, and such regions may overlap in whole or part, or may be adjacent or otherwise separated from one other. In certain circumstances, a particular region may correspond to a multidimensional geographic area or space, or the like.

In some examples, each geographic zone may correspond to a geographic coverage area associated with a base station (e.g., a geographic coverage area corresponding to a communication coverage area provided by a base station). Aspects of the disclosure may include determining (e.g., establishing) a geographic zone based on communication coverage capabilities (e.g., transmit power, communications technologies, etc.) of a base station. In an example, the base station may support communications between the base station and UEs within the geographic zone, communications among the UEs within the geographic zone, or a combination thereof. The base station may provide communication coverage for the geographic zone, for example, via communications links as described herein.

In some other examples, each geographic zone may correspond to a geographic coverage area made up of sectors (e.g., a geographic coverage area 110 as described herein). Aspects of the disclosure may include determining (e.g., identifying) a geographic zone based on sectors making up a portion of the geographic zone, where each sector may be associated with a cell. In an example, multiple base stations may each provide communication coverage for a macro cell, a small cell, a hot spot, or other types of cells, or various combinations thereof. Aspects of the disclosure may include determining (e.g., identifying) a geographic zone based on sectors corresponding to the cells (e.g., sectors corresponding to macro cells, small cells, hot spots, or other types of cells), for example, such that the geographic zone corresponds to a communication coverage area associated with the sectors or the cells. In some example aspects, the geographic zone may correspond to a communication coverage area determined (e.g., provided) by multiple base stations of a wireless communications system (e.g., a heterogeneous LTE/LTE-A/LTE-A Pro or NR network).

In some other examples, geographic zones may vary in size. Aspects of the disclosure may include determining (e.g., identifying) a geographic zone based on a type of cell. For example, a macro cell generally covers a relatively large geographic area (e.g., several kilometers in radius) and may allow unrestricted access by UEs with service subscriptions with a network provider. A small cell (e.g., pico cells, femto cells, and micro cells) may be associated with a lower-powered base station, as compared with a macro cell, and may generally cover a relatively small geographic area (e.g., a home network). Aspects of macro cells and small cells are described herein.

The receiving wireless device may receive signals transmitted by one or more transmitting wireless devices and determine (e.g., identify) that the signals were transmitted from one or more wireless devices located in the second geographic zone. The signals may include configured transmit power information. In some aspects, the receiving wireless device may measure a received signal power (e.g., RSRP) of the signals and estimate a path loss between the first geographic zone and the second geographic zone based on comparing the configured transmit power of the signals with the received power of the signals. Estimating the path loss may include estimating a device-to-device path loss between the receiving wireless device and a transmitting wireless device, estimating device-to-zone path loss between the receiving wireless device and one or more transmitting wireless devices within the same zone, estimating a zone-to-zone path loss based on one or more receiving wireless devices (e.g., multiple receiving wireless devices located within the same zone and exchanging information) and one or more transmitting wireless devices within the same zone. In some aspects, estimated device-to-device path loss, device-to-zone path loss, zone-to-zone path loss, or combination thereof may be determined by the receiving wireless device.

Aspects of the disclosure include determining a per-device path loss (e.g., device-to-device) for signals received from the same transmitting wireless device. The per-device path loss may be estimated by averaging, or filtering, path loss estimation of signals received from the same transmitting wireless device to compensate for transmit power uncertainties, reference signal received power (RSRP) measurement error, fast fading, or the like. Per-device path loss may be filtered to account for large time scale signal attenuating factors such as blocking, for example, where the signal between the transmitter and the receiver is blocked by other objects (a car, pedestrian, building, etc.). In some aspects, the per-device path loss may be weighted by the number of signals (e.g., packets) received from the same device. Multiple per-device path loss estimations may be used to calculate a zone-to-zone estimated path loss. In some aspects, the estimated path loss (e.g., device-to-zone, zone-to-zone, or the like) may be calculated by taking a weighted mean of the per-device path loss. In other aspects, the estimated path loss may be calculated by taking a weighted median of the per-device path loss. In some aspects, a wireless device located within the same geographic zone may exchange path loss estimation information with other wireless devices located in the same zone. Such operations may improve path loss estimation (e.g., zone-to-zone path loss estimation) or signal transmission quality.

Aspects of the disclosure include the receiving wireless device configuring the transmit power for transmissions to one or more wireless devices located in the second geographic zone based on the estimated path loss. In this regard, for example, the receiving wireless device may determine a transmit power that reduces interference and results in greater spatial reuse.

Particular aspects of the subject matter described in this disclosure may be implemented to realize one or more of the following potential advantages, among others. The techniques employed by the devices may provide benefits and enhancements to the operation of the devices. For example, operations performed by the devices may provide improvements to path loss estimation. In some examples, estimating a path loss of wireless communications between a first geographic zone and a second geographic zone and communicating based on the estimated path loss, among other examples related to wireless communications, may support improvements to reducing power consumption (e.g., by adjusting transmission power based on the estimated path loss), increasing transmission throughput (e.g., due to reduced interference resulting from the adjusted transmission power), and increasing spatial reuse, among other advantages.

Aspects of the disclosure of the disclosure are initially described in the context of a wireless communications systems. Aspects of the disclosure are then described in the context of a process flow diagram. Aspects of the disclosure are further illustrated by and described with reference to apparatus diagrams, system diagrams, and flowcharts that relate to path loss estimation.

FIG. 1 illustrates an example of a wireless communications system 100 that supports path loss estimation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to determine, or identify (e.g., by the base station 105 or a receiving device, such as a UE 115), a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for determining, or identifying, a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may include peer to peer communications such as vehicle to everything (V2X) communications. In some cases, one or more direct communications links 125 can be established between one or more UEs. Such communications links 125 may include unicast communications, multicast communications, broadcast communications, or a combination, thereof. In some cases, the direct communication links 125 between UEs may include direct channel communications such as a PC5 interface (e.g., side link) between the UEs. Device-to-device communications may also include communication transmissions occurring via one or more base stations 105, other UEs 115 over communications links 125, via backhaul links 134 or the like.

Particular aspects of the subject matter described herein may be implemented to realize one or more advantages. The described methods, systems, devices, and apparatuses provide techniques which may support improvements to path loss estimation. As such, supported techniques may include features for estimating a path loss of wireless communications between a first geographic zone and a second geographic zone and communicating based on the estimated path loss. The supported techniques may reduce power consumption (e.g., by adjusting transmission power based on the estimated path loss), increase transmission throughput (e.g., due to reduced interference resulting from the adjusted transmission power), and increase spatial reuse, among other advantages.

Figure 2A:
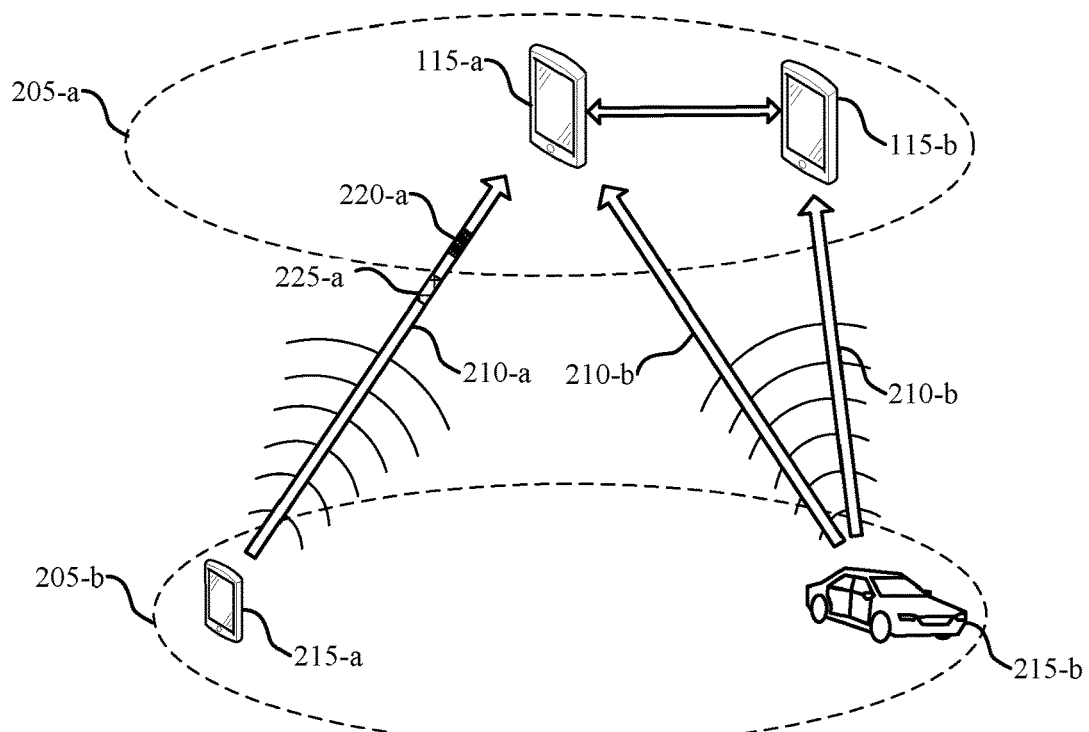
FIGS. 2A and 2B illustrate an example of a system for wireless communications that supports path loss estimation in accordance with aspects of the present disclosure.

FIG. 2A illustrates an example of a wireless communications system 200-*a* that supports path loss estimation in accordance with aspects of the present disclosure. In some examples, the wireless communications system 200-*a* may implement aspects of wireless communications system 100. The wireless communications system 200-*a* may include a receiving wireless device 115-*a* and one or more transmitting wireless devices 215, which may be examples of the UEs 115 described with reference to FIG. 1. The wireless communications system 200-*a* illustrates an example of a path loss estimation procedure where receiving wireless device 115-*a* located in a first geographic zone 205-*a* receives a plurality of signals 210 from transmitting wireless devices 215 located in a second geographic zone 205-*b*. In some aspects, in response (e.g., based on the signals 210), receiving wireless device 115-*a* may estimate a path loss of wireless communications between the first geographic zone 205-*a* and the second geographic zone 205-*b*. Estimating the path loss may include estimating one or more device-to-device path losses, one or more device-to-zone path losses, one or more zone-to-zone path losses between receiving wireless device 115-*a* and transmitting wireless devices 215, or a combination thereof. Receiving wireless device 115-*a* or other UE(s) 115 located in the first geographic zone 205-*a* may configure one or more operational parameters based on the estimated path loss. For example, receiving wireless device 115-*a* or other UE(s) 115 located in the first geographic zone 205-*a* may configure a transmit power to transmit at least one signal within at least a portion of the second geographic zone 205-*b* based on the estimated path loss.

Receiving wireless device 115-*a* may receive multiple signals 210 from one or more transmitting wireless devices 215, and in some aspects, estimate a path loss between the first geographic zone 205-*a* and the second geographic zone 205-*b* based on the multiple signals 210. Transmitting wireless devices 215 may transmit the one or more signals 210 using variety of methods such as unicast, multicast, broadcast, or a combination thereof. For example, transmitting wireless devices 215 may transmit one or more multicast signals 210, which may be received by receiving wireless device 115-*a*. Each signal 210 may include location information 220 about a geographic location of transmitting wireless device 215 transmitting the signal 210. In some aspects, location information 220 (e.g., location information 220-*a*) may include a zone identifier that indicates that transmitting wireless devices 215 are located in the second geographic zone 205-*b*. For example, transmitting wireless devices 215-*a* and 215-*b* may each know their geographic location based on global positioning system (GPS) data included in location information 220. Using the information related to their geographic location, each transmitting wireless device 215 (e.g., each of the transmitting wireless devices 215-*a* and 215-*b*) may determine a geographic zone 205 in which the wireless device 215 is currently located. In some aspects, geographic zones 205 may associate a physical geographical region (e.g., portion of land) having a defined geometric area (e.g., polygon having defined edges and vertices). In some aspects, transmitting wireless device 215 may include a zone identifier in the location information 220 transmitted in one or more signals 210.

In some aspects, transmitting wireless devices 215 may transmit location information 220 that includes higher level positioning data such as GPS data, and receiving wireless device 115-a may use location information 220 to determine that transmitting wireless devices 215 are located in the second geographic zone 205-b. Receiving wireless device 115-a may determine its geographic location information, for example, using the GPS data. For example, based on the GPS data, receiving wireless device 115-a may determine (e.g., identify) that it is located in the first geographic zone 205-a. In this regard, for example, receiving wireless device 115-a may determine that received signals such as signals 210 are from a geographic zone different from the geographic zone in which receiving wireless device 115-a is located (e.g., a geographic zone different from the first geographic zone 205-a).

In an example, receiving wireless device 115-a may determine that received signals such as signals 210 are transmitted from outside of the geographic zone in which receiving wireless device 115-a is located (e.g., outside a geographic area corresponding to the geographic zone). For example, receiving wireless device 115-a may determine that received signals such as signals 210 are transmitted from outside of the geographic zone, based on GPS coordinates associated with the geographic area (e.g., based on whether the received signals such as signals 210 are transmitted from outside the geographic area, as defined based on the GPS coordinates). In an example aspect where the geographic zone includes a region corresponding to a multidimensional geographic area (e.g., a three dimensional space), the GPS coordinates may include latitude, longitude, and elevation.

Transmitting wireless devices 215 may implicitly determine (e.g., identify) one or more geographic zones 205. For example, transmitting wireless device 215-a may send signal 210-a including a transmitter identification that identifies the transmitting wireless device 215-a as the sending device. Receiving wireless device 115-a may receive signal 210-a, determine (e.g., identify) the transmitter identification included in signal 210-a, and compare the transmitter identification with other messages received by receiving wireless device 115-a. In some aspects, receiving wireless device 115-a may compare the transmitter identification with a control message or state information message. In some examples, a state information message may be a vehicle safety state information message comprising a zone identification, geographic location, or the like for the transmitting wireless device 215-a. In some aspects, receiving wireless device may determine that transmitting wireless device 215-a is located in the second geographic zone 205-b based on comparing the transmitter identification with information received in other messages.

In an example, receiving wireless device 115-a may determine that signal 210-a was transmitted from the second geographic zone 205-b (e.g., from inside a geographic area corresponding to the second geographic zone 205-b). For example, receiving wireless device 115-a may determine that signal 210-a was transmitted from inside the second geographic zone 205-b, based on the transmitter identification (e.g., based on the zone identification, geographic location, or the like for the transmitting wireless device 215-a). In an example aspect, the zone identification may include an indication that the transmitting wireless device 215-a is in the second geographic zone 205-b (e.g., an indication that the transmitting wireless device 215-a is located in a geographic area corresponding to the second geographic zone 205-b).

Transmitting wireless devices 215 may transmit signals 210 that include transmit power information 225. Transmitting wireless devices 215 may transmit location information 220, power information 225, or both in the same or different signals 210. Transmit power information 225 may indicate a configured transmit power for a corresponding signal 210. For example, transmitting wireless device 215-a may configure a first of one or more signals 210-a to be transmitted with a first configured transmit power, and send the first signal 210-a according to the configured transmit power. In this regard, for example, transmit power information 225 included in signal 210-a may indicate the configured transmit power for signal 210-a. In some aspects, receiving wireless device 115-a may receive signal 210-a and determine (e.g., identify) the configured transmit power associated with the transmission of signal 210-a. Thus, in aspects where receiving wireless device 115-a receives multiple signals 210 from one or more transmitting wireless devices 215, receiving wireless device 115-a may determine (e.g., identify) a configured transmit power for each received signal 210.

In some aspects, the configured transmit power for a signal 210 may be implicitly identified. In some aspects, implicit identification may include a transmitting wireless device and receiving wireless device following the same procedure to configure a transmit power based on resource allocation, modulation coding scheme (MCS), and congestion level. In some aspects, based on this information being included in the control message, the receiving wireless device can apply the same procedure to the parameter in the control message sent by the transmitting wireless device to determine the configured transmit power of the received message (e.g., message transmitted by the transmitting wireless device).

Receiving wireless device 115-a may determine received power information for each of the received signals 210. For example, receiving wireless device 115-a may determine a reference signal received power (RSRP), a received signal strength indicator (RSSI), reference signal received quality (RSRQ) or the like, or a combination thereof for each signal 210 received from transmitting devices 215. In some aspects, receiving wireless device 115-a may associate received power information with configured transmit power information 225 (e.g., transmit power information 225-a) for each signal received from transmitting wireless devices 215 located in the second geographic zone 205-b. In some aspects, receiving wireless device 115-a may calculate an estimated path loss between the first geographic zone 205-a and the second geographic zone 205-b. For example, the estimated path loss may be calculated (e.g., receiving wireless device 115-a may calculate the estimated path loss) by comparing the RSRP information and the configured transmit information. In some aspects, estimating path loss may include subtracting the configured transmit power from the estimated RSRP, for example, in a decibel (dB) scale.

In some aspects, device-to-zone path loss may be estimated based on a device-to-device path loss between the first geographic zone 205-a and the second geographic zone 205-b. In some aspects, a zone-to-zone path loss (e.g., path loss between the first geographic zone 205-a and the second geographic zone 205-b) may be calculated based on multiple device-to-zone path loss estimates. That is, examples of aspects described herein may include determining a per-device path loss estimate (e.g., device-to-device path loss, or the like) for each transmitting wireless device 215. For example, wireless receiving device 115-*a* may receive one or more signals 210-*a* from a first transmitting wireless device 215-*a*, one or more signals 210-*b* from a second transmitting wireless device 215-*b*, or a combination thereof. Wireless receiving device 115-*a* may calculate a first per-device path loss estimate (e.g., device-to-device path loss) for transmitting wireless device 215-*a* as described herein (e.g., based on RSRP and configured transmit power). Similarly, wireless receiving device 115-*a* may calculate a second per-device path loss estimate (e.g., device-to-device path loss) for transmitting wireless device 215-*b*. In some aspects, receiving wireless device 115-*a* may calculate an estimated path loss between the first geographic zone 205-*a* and the second geographic zone 205-*b* based on per-device path loss estimates for the multiple transmitting wireless devices 215 located in the second geographic zone 205-*b*. In some aspects, the estimated path loss may include a device-to-zone path loss between receiving wireless device 115-*a* and the second geographic zone 205-*b* (e.g., based on one on or more device-to-device path loss estimates). Additionally or alternatively, the location of receiving wireless device 115-*a* can be imputed to the first geographic zone, and the estimated path loss (e.g., based on signals 210 received by wireless receiving device 115-*a*) may include or be defined as a zone-to-zone path loss between the first geographic zone 205-*a* and the second geographic zone 205-*b*. In some aspects, the zone-to-zone path loss can further be estimated/refined based on multiple receiving wireless devices 115 in the first geographic zone 205-*a* exchanging path loss information.

In some aspects, estimating the path loss between the first geographic zone 205-*a* and the second geographic zone 205-*b* (e.g., device-to-zone path loss, zone-to-zone path loss, or the like) may include calculating a weighted mean of multiple per-device path loss estimates (e.g., multiple device-to-device path loss estimates). Additionally or alternatively, estimating the path loss between the first geographic zone 205-*a* and the second geographic zone 205-*b* may include calculating a weighted median of multiple per-device path loss estimates. In some example implementations, other techniques such as mode calculations, range calculations, deviations, statistical analysis or the like may be used in estimating the path loss between zones (e.g., device-to-zone path loss, zone-to-zone path loss, or the like).

Per-device path loss estimates may be determined in a variety of ways. In some aspects, a per-device path loss estimate may be calculated based on a weighted number of signals 210 received from a transmitting wireless device 215. For example, a per-device path loss for transmitting wireless device 215-*a* may be estimated by calculating a weighted number of signals 210-*a* received from transmitting wireless device 215-*a*. In some aspects, each signal 210-*a* may be an example of a packet transmitted from transmitting wireless device 215-*a* and received by receiving wireless device 115-*a*.

In some aspects, the received power information and transmit power information 225 from each signal 210 received by receiving wireless device 115-*a* may be used to determine an estimated per-device path loss. The estimated per-device path loss may be based on multiple signals (e.g., signals 210-*a*) received from a transmitting wireless device (e.g., transmitting wireless device 215-*a*). Received signals such as signals 210-*a* may be affected by configured transmit power uncertainty and a received power measurement error (e.g., RSRP measurement error). Further, transmission effects such fast fading, shadowing and blocking may have varying effects on the estimated per-signal path loss. In some example aspects, the techniques described herein may include filtering uncertainty and some transmission effects (e.g., fast fading) by averaging multiple signals (e.g., signals 210-*a*) from the same transmitting wireless device (e.g., transmitting wireless device 215-*a*). In some aspects, one or more signals 210-*a* transmitted by wireless transmitting device 215-*a* may be examples of packet transmissions. By averaging multiple packets received from transmitting wireless device 215-*a*, transmit power uncertainty, RSRP measurement error, and fast fading can be filtered with respect to the estimated path loss.

Additionally or alternatively, blocking or other transmission effects can be filtered from the estimated path loss. In some aspects, blocking may occur as a result of objects blocking a line-of-sight path from the transmitter to the receiver. For example, in V2X communications, blocking may result from a car passing between transmitting wireless device 215-*a* and receiving wireless device 115-*a* while signal 210-*a* is being transmitted. In one or more aspects, blocking may be filtered from the estimated path loss using outlier rejection. For example, some aspects described herein may include filtering blocking by implementing a Gaussian distribution analysis. In some aspects, the filtering (e.g., implementing a Gaussian distribution analysis) may include classifying signals 210 or estimated per-device path losses that have some identified variance from a mean value as an outlier and removing the classified signals 210 or estimated per-device path losses from the estimated path loss calculation. In an example aspect, the filtering may include classifying a signal 210 (and removing the classified signal 210 from the estimated path loss calculation) based on a difference between a value of the signal 210 and a mean value of signals 210 received by receiving wireless device 115-*a* (e.g., based on the difference exceeding a threshold). In some example aspects, the filtering may include classifying the signal 210 (and removing the classified signal 210) based on a difference between the RSRP of the signal 210 and a mean RSRP value of signals 210 received by receiving wireless device 115-*a*. In some aspects, the filtering may include classifying the signal 210 (and removing the classified signal 210) based on a difference between a transmit power of the signal 210 and a mean transmit power of signals 210 received by receiving wireless device 115-*a*. Additionally or alternatively, other filtering methods such as collaborative filtering (e.g., clustering) or binary decision methods may be used to determine (e.g., identify) and remove outlying signals 210, such as signals 210 effected by blocking.

Additionally or alternatively, receiving wireless device 115-*a* may determine (e.g., identify) an accuracy requirement for estimating a path loss. In some aspects, determining the accuracy requirement may include identifying a time window for receiving a set of signals for transmitting wireless devices 215 located in the second geographic zone 205-*b*. The receiving wireless device 115-*a* may determine whether the estimated path loss for the set of signals received within the time window meets the accuracy requirement.

In some example implementations, estimated path loss information may be exchanged with wireless devices located within the same zone. In some aspects, the exchange of estimated path loss information may improve accuracy of the zone-to-zone estimated path loss. In an example of the exchange of estimated path loss information, receiving wireless device 115-*a* may receive path loss information from one or more other wireless devices located within the first geographic zone 205-a. For example, receiving wireless device 115-a may receive path loss information from second wireless device 115-b located within the first geographic zone 205-a. In this regard, for example, second wireless device 115-b may receive signals 210 from one or more transmitting wireless devices 215 located in the second geographic zone 205-b. In some examples, second wireless device 115-b may receive signals 210 from the same or different transmitting wireless devices 215. In some aspects, path loss information may include a variety of information identified or determined by second wireless device 115-b. For example, second wireless device 115-b may determine a per-device path loss estimate, RSRP or other received power estimates, configured transmit powers, zone identifications, transmitting device identifications, or the like, for signals second wireless device 115-b receives. As such, second wireless device 115-b may calculate the zone-to-zone estimated path loss for signals 210 received from second geographic zone 205-b and transmit this estimated path loss to receiving wireless device 115-a. In some aspects, second wireless device 115-b may send per-device path loss estimates, RSRP, configured transmit powers, zone identifications or the like to receiving wireless device 115-a, which receiving wireless device 115-a may use to calculate the estimated path loss. The exchange of information between wireless devices (e.g., receiving wireless device 115-a and second wireless device 115-b) as described herein may improve accuracy of the zone-to-zone path estimated path loss.

Figure 2B:
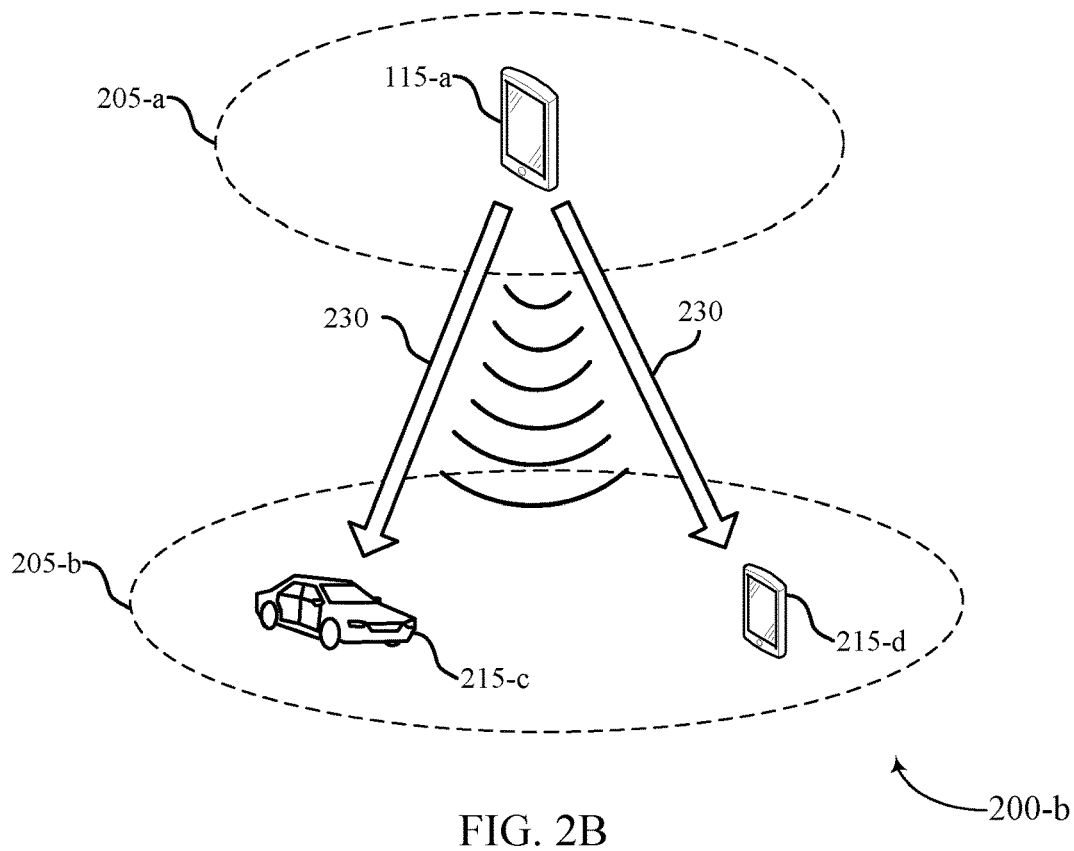

FIG. 2B illustrates an example of a wireless communications system 200-b that supports path loss estimation in accordance with aspects of the present disclosure. In some examples, the wireless communications system 200-b may implement aspects of wireless communications system 100 or 200-a. The wireless communications system 200-b may include a receiving wireless device 115-a and one or more transmitting wireless devices 215, which may be examples of the UEs 115, receiving wireless devices 115 or transmitting wireless devices 215 described with reference to FIGS. 1 and 2. The wireless communications system 200-b illustrates an example of a path loss estimation procedure where receiving wireless device 115-a located in a first geographic zone 205-a transmits one or more signals to the second geographic zone 205-b based on estimating the path loss between the first geographic zone 205-a and the second geographic zone 205-b as discussed herein.

As described with reference to FIG. 2A, receiving wireless device 115-a may estimate a path loss between the first geographic zone 205-a and the second geographic zone 205-b. Receiving wireless device 115-a may estimate the path loss based on multiple signals received from one or more transmitting wireless devices (e.g., transmitting wireless devices 215-a and 215-b) located within the second geographic zone 205-b. Referring to FIG. 2B, receiving wireless device 115-a may transmit one or more signals 230 to second geographic zone 205-b based on the estimated the path loss. For example, receiving wireless device 115-a may configure the transmit power for sending signals 230 based on the estimated path loss. In this regard, for example, receiving wireless device 115-a may transmit signals 230 at a power level that has an estimated certainty of reaching wireless devices 215c and 215-d located within second geographic zone 205-b. One or more of wireless devices 215-c and 215-d may be the same or different wireless device as wireless devices 215-a and 215-b discussed with reference to FIG. 2A. In this regard, for example, receiving wireless device 115-a may set the transmit power of signals 230 to a level which may reduce interference with other communications and/or increase spatial reuse.

Figure 3:
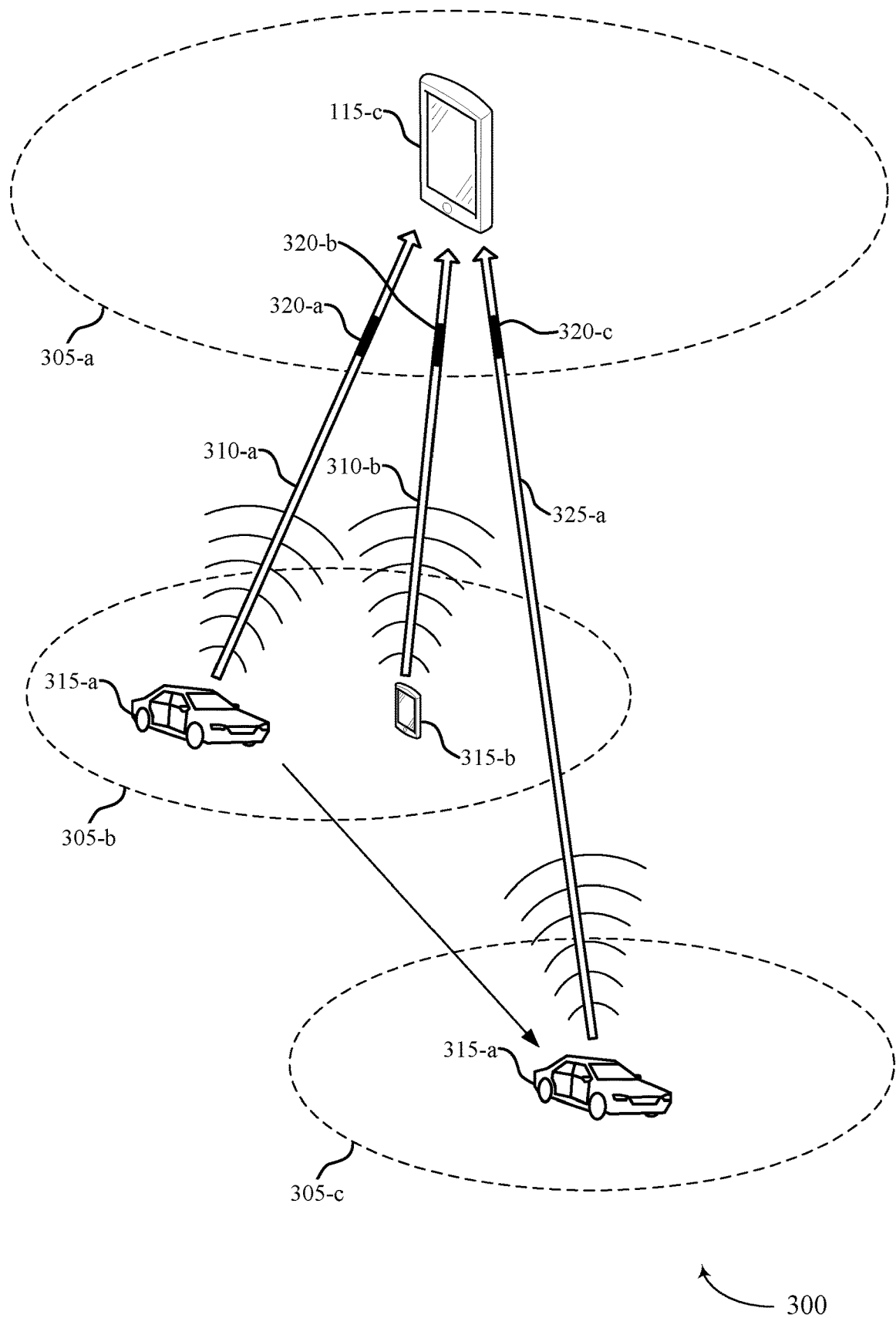
FIG. 3 illustrates an example of a system for wireless communications that supports path loss estimation in accordance with aspects of the present disclosure.

FIG. 3 illustrates an example of a wireless communications system 300 that supports path loss estimation in accordance with aspects of the present disclosure. In some examples, wireless communications system 300 may implement aspects of wireless communications system 100 or 200. The wireless communications system 300 may include a receiving wireless device 115-c and one or more transmitting wireless devices 315, which may be examples of the receiving wireless devices 115 (e.g., UEs) or transmitting wireless devices 215 described with reference to FIGS. 1 and 2.

The wireless communications system 300 illustrates an example of a path loss estimation procedure where receiving wireless device 115-c located in a first geographic zone 305-a receives multiple signals 310 (e.g., signals 310-a and 310-b) from one or more transmitting wireless devices 315 (e.g., transmitting wireless devices 315-a and 315-b) located in a second geographic zone 305-b. In some aspects, a transmitting wireless device 315 (e.g., transmitting wireless device 315-a, transmitting wireless device 315-b) may transmit signals 310 (e.g., signals 310-a, signals 310-b) corresponding to a set of transmit power parameters 320 (e.g., transmit parameters 320-a, transmit parameters 320-b). Referring to the example illustrated in FIG. 3, receiving wireless device 115-c may receive signals 325 (e.g., signal 325-a) from a transmitting wireless device 315 (e.g., transmitting wireless device 315-a) which has relocated from the second geographic zone 305-b to a third geographic zone 305-c, for example, when the transmitting wireless device 315 is located in the third geographic zone 305-c.

In some aspects, such as V2X, one or more wireless devices 315 (e.g., a vehicle, a UE, such as UE 115, or the like) may move between geographic zones 305. For example, a first transmitting wireless device 315-a may initially be located in second geographic zone 305-b and subsequently move to a third geographic zone 305-c. In some aspects, one or more transmitting wireless devices 315 may transmit a first set of signals 310 from (e.g., while located in) second geographic zone 305-b, where each of the first set of signals 310 is configured with a first set of transmit power parameters 320. For example, transmitting wireless device 315-a may transmit one or more signals 310-a each according to a corresponding first set of transmit power parameters 320-a. The first set of signals 310 may be received by receiving device 115-c. In some aspects, the first set of signals 310 may include a transmitting wireless device identification (e.g., wireless device identification for transmitting wireless devices 315), configured transmit power information based on the first set of transmit power parameters 320-a, and zone identification information associated with the second geographic zone 305-b. Receiving device 115-c may estimate a path loss between the first geographic zone 305-a and the second geographic zone 305-b based on the first set of signals 310 as described herein.

After (or during) transmitting first set of signals 310, one or more of the transmitting wireless devices 315 may move to a different geographic location. For example, first transmitting wireless device 315-a may move to third geographic zone 305-c. While in third geographic zone 305-c, for example, first transmitting wireless device 315-a may determine (e.g., identify) that it has left the second geographic zone 305-b and that its current location is associated with third geographic zone 305-c. Transmitting wireless device 315-a may configure a second set of transmit power parameters 320-c for transmitting a second set of signals 325-a from the third geographic zone 305-c. First transmitting wireless device 315-a may transmit the second set of signals 325-a, which may include a transmitting wireless device identification (e.g., wireless device identification for transmitting wireless device 315-a), configured transmit power information based on the second set of transmit power parameters 320-c, and zone identification information associated with the third geographic zone 305-c. Receiving device 115-c may estimate a path loss between the first geographic zone 305-a and the third geographic zone 305-c based on the second set of signals 325-a as described herein.

Figure 4:
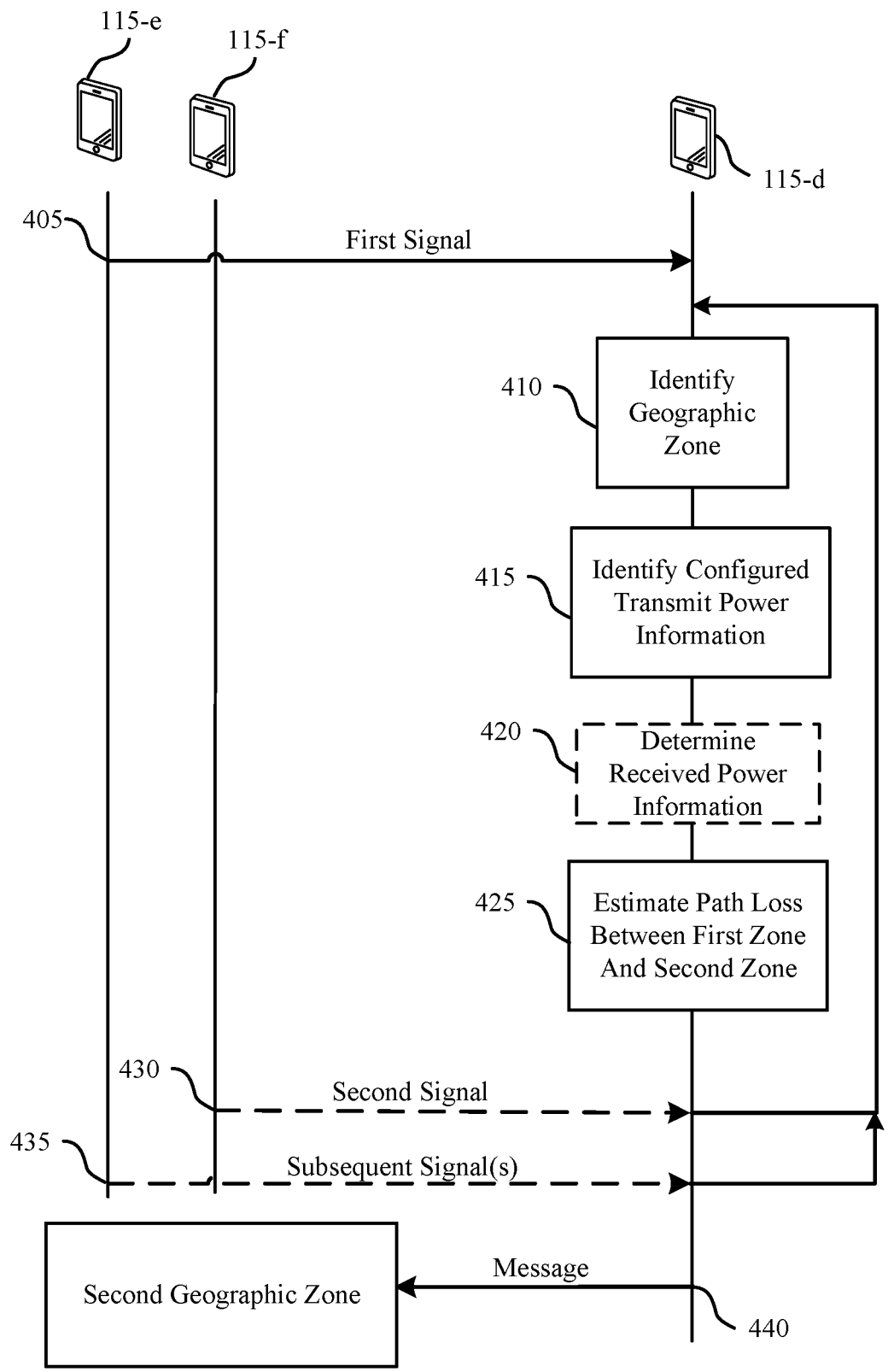
FIG. 4 illustrates an example of a process flow that supports path loss estimation in accordance with aspects of the present disclosure.

FIG. 4 illustrates an example of a process flow 400 that supports path loss estimation in accordance with aspects of the present disclosure. In some examples, process flow 400 may implement aspects of wireless communications system 100, 200 or 300. Process flow 400 may include a receiving wireless device 115-d and transmitting wireless devices 115-e and 115-f, which may be examples of receiving wireless devices (e.g., UEs) 115, transmitting wireless devices 215, and transmitting wireless devices 315 described with reference to FIGS. 1, 2 and 3. The process flow 400 may include functions or communications implemented by receiving wireless device 115-d and transmitting wireless devices 115-e and 115-f in the context of path loss estimation procedures discussed herein.

At 405, a first transmitting wireless device 115-e may transmit a first signal. The first signal may be transmitted via unicast, multicast, broadcast, or other transmission method. In some aspects, the first signal may be transmitted according to a first configured transmit power. In this regard, for example, the first signal may include transmit power information, which indicates the first configured transmit power that the first signal was transmitted according to. In some examples, the first signal may include a geographic zone indication that identifies that the first transmitting wireless device 115-e transmitted the first signal from a second geographic zone.

At 410, receiving wireless device 115-d may receive the first signal and determine (e.g., identify) that first transmitting wireless device 115-e is located in the second geographic zone. In some aspects, receiving wireless device 115-d may be located in a first geographic zone and determine that transmitting wireless device 115-e is located in the second geographic zone, which is different from the first geographic zone.

At 415, receiving wireless device 115-d may determine (e.g., identify) configured transmit power information from the first signal. In an example, the configured transmit power information may include a configured transmit power that the first signal was transmitted according to. In another example, transmitting wireless device 115-e, transmitting wireless device 115-e 115-f, or both may configure a transmit power for sending the first signal (e.g., packet). In this regard, for example, a transmitting wireless device 115 (e.g., transmitting wireless device 115-e, transmitting wireless device 115-e 115-f, or both) may determine the configured transmit power as a function of a number of factors including the signal size (e.g., packet size), allowed power levels, data rate, or the like, and the configured transmit power information may include these factors. In some aspects, a receiving wireless device 115 (e.g., receiving wireless device 115-d) may infer the configured transmit power by applying the same function to the received configured transmit power information.

At 420, receiving wireless device 115-d may determine received power information for the first signal. In some aspects, receiving wireless device 115-d may measure one or more parameters of the received signal to determine a received power information for the first signal. Determining received power information may include calculating an RSRP, RSSI, RSRQ, or the like. In some aspects, the received power information may be an estimated RSRP determined by receiving wireless device 115-d based on receiving the first signal. The estimated RSRP may take into account measurement error or other uncertainty associated with detecting and calculating the RSRP.

At 425, receiving wireless device 115-d may estimate a path loss between the first geographic zone and the second geographic zone. The estimated path loss may be a device-to-device path loss between the receiving wireless device 115-d and transmitting wireless device 115-e. In some aspects, the position of transmitting wireless device 115-e may be imputed to the second geographic zone, and the estimated path loss may be defined as a device-to-zone path loss between receiving wireless device 115-d and the second geographic zone. Some aspects may include imputing the positions of receiving wireless device 115-d to the first geographic zone, and the estimated path loss may be defined as a zone-to-zone path loss between the first geographic zone and the second geographic zone. In some example aspects, in estimating the path loss, receiving wireless device 115-d may compare the estimated received power information with the configured transmit power that was indicated in the first signal. For example, a receiving wireless device (e.g., receiving wireless device 115-d) may estimate the path loss between its geographic zone (e.g., a first geographic zone) and a second geographic zone associated with a transmitting wireless device (e.g., transmitting wireless device 115-e) by subtracting the configured transmit power from the estimated RSRP, for example, in a dB scale.

At 430, a second transmitting wireless device 115-f may transmit or send a second signal. The second signal may be transmitted via unicast, multicast, broadcast, or other transmission method. In some aspects, the second signal may be transmitted according to a second configured transmit power. In this regard, for example, the second signal may include transmit power information, which indicates the second configured transmit power that the subsequent signal was transmitted according to. In some examples, the second signal may include a geographic zone indication that identifies a second geographic zone that the second transmitting wireless device 115-f is located in. Receiving wireless device 115-d may update (re-calculate, refine, etc.) the estimated path loss between the first geographic region and the second geographic region based on receiving the second signal. The estimated path loss may be calculated (updated) by averaging, filtering, or the like as described herein.

At 435, first transmitting wireless device 115-e (or second transmitting wireless device 115-f) may send one or more subsequent signals. The subsequent signals may be transmitted via unicast, multicast, broadcast, or other transmission method. In some aspects, the subsequent signal may be transmitted according to a second configured transmit power. In this regard, for example, the second signal may include transmit power information, which indicates the second configured transmit power that the subsequent signal was transmitted according to. In some examples, the subsequent signal may include a geographic zone indication that identifies a second geographic zone that the second transmitting wireless device 115-f is located in. Receiving wireless device 115-d may update (re-calculate, refine, etc.) the estimated path loss between the first geographic region and second geographic region based on receiving subsequent signals from one or more transmitting wireless devices 115 (e.g., transmitting wireless device 115-*e*, transmitting wireless device 115-*f*) transmitting the subsequent signals from the second geographic zone. The estimated path loss may be calculated (updated) by averaging, filtering, or the like as described herein.

At 440, receiving wireless device 115-*d* may transmit to one or more wireless devices located in the second geographic zone based on the estimated path loss. In some aspects, receiving wireless device 115-*d* may configure one or more operational parameters associated with wireless communications. For example, receiving wireless device 115-*d* may configure one or more transmit powers for transmitting one or more signals (e.g., packets) associated with wireless communications. In some aspects, the transmit powers may be configured differently for each signal. The configured transmits power for each signal may be based on the estimated path loss between the first geographic zone and the second geographic zone. In this regard, for example, the techniques described herein may include configuring the transmit power such that there is an estimated certainty that receiving wireless devices located in the second zone will receive the signals, while reducing interference with other wireless devices that are not the intended recipient of the signals. In some aspects, the efficiency of wireless communications such as in a peer-to-peer multicast system may be increased by reducing interference, increasing spatial reuse, or both.

Figure 5:
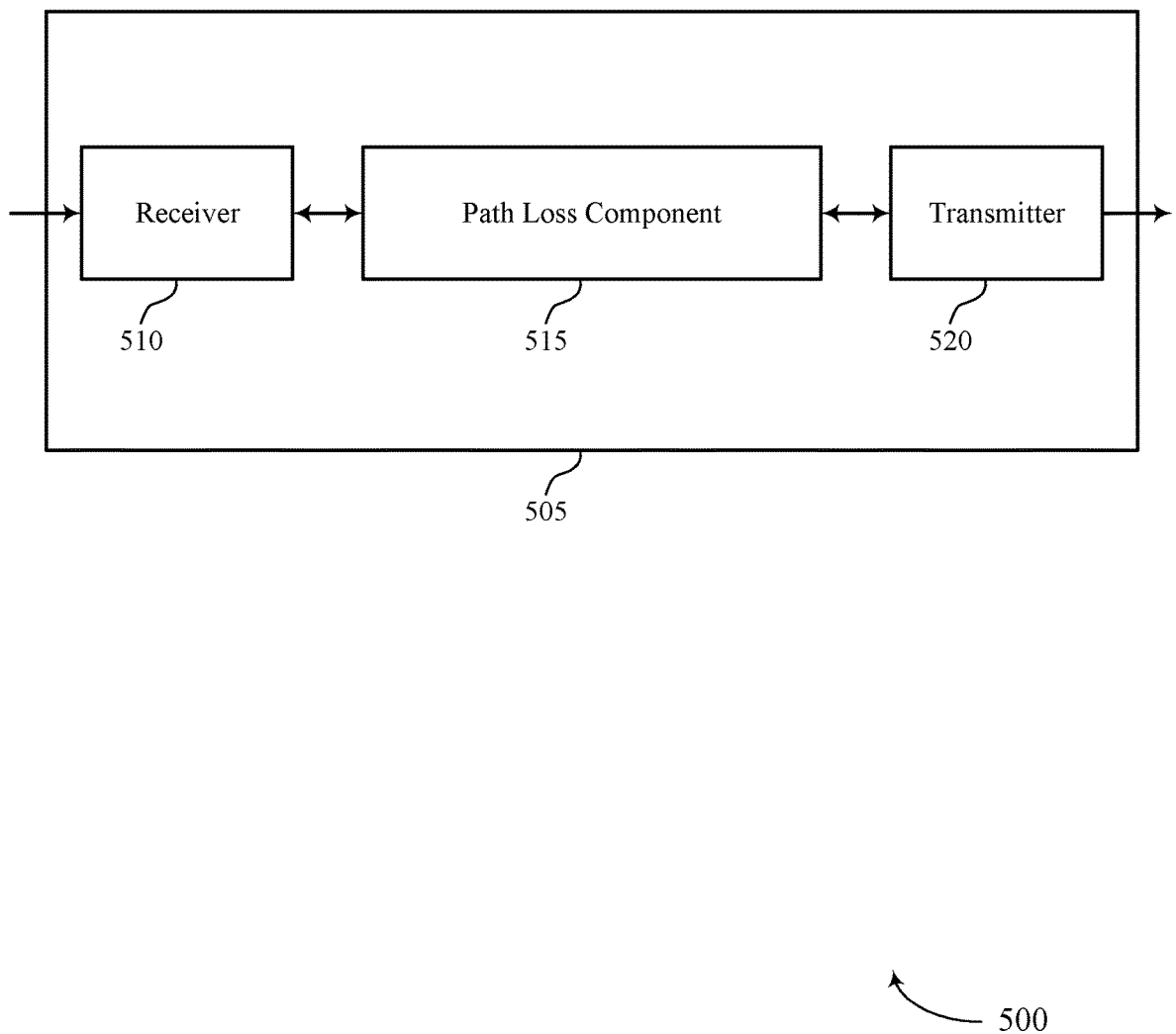
FIGS. 5 and 6 show block diagrams of devices that support path loss estimation in accordance with aspects of the present disclosure.

FIG. 5 shows a block diagram 500 of a device 505 that supports path loss estimation in accordance with aspects of the present disclosure. The device 505 may be an example of aspects of a UE 115 as described herein. The device 505 may include a receiver 510, a path loss component 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to path loss estimation, etc.). Information may be passed on to other components of the device 505. The receiver 510 may be an example of aspects of the transceiver 820 described with reference to FIG. 8. The receiver 510 may utilize a single antenna or a set of antennas.

The path loss component 515 may receive, at a receiving wireless device in a first geographic zone, a set of signals from one or more transmitting wireless devices, determine (e.g., identify), based on the set of signals, that the one or more transmitting wireless devices are in a second geographic zone different from the first geographic zone, determine (e.g., identify) configured transmit power information for each of the set of signals from the one or more transmitting wireless devices that are in the second geographic zone, estimate a path loss of wireless communications between the first geographic zone and the second geographic zone based on the configured transmit power information, and communicate (e.g., transmit at least one signal) within at least a portion of the second geographic zone based on the estimated path loss. The path loss component 515 may determine (e.g., identify), at a transmitting wireless device, a transmitting zone associated with a geographic location of the transmitting wireless device, configure a first set of transmit power parameters for a first set of signals to be transmitted from the transmitting wireless device, located in the transmitting zone, to a first set of receiving devices, and transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof. The path loss component 515 may be an example of aspects of the path loss component 810 described herein.

The actions performed by the path loss component 515 as described herein may be implemented to realize one or more potential advantages. One implementation may allow a UE 115 to save power and increase battery life by adjusting transmission power based on estimated path loss. Additionally or alternatively, the UE 115 may further increase transmission throughput (e.g., due to reduced interference resulting from the adjusted transmission power). Another implementation may provide improved spatial reuse, as interference between transmitted signals may be reduced.

The path loss component 515, or its sub-components, may be implemented in hardware, code (e.g., software or firmware) executed by a processor, or any combination thereof. If implemented in code executed by a processor, the functions of the path loss component 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The path loss component 515, or its sub-components, may be physically located at various positions, including being distributed such that portions of functions are implemented at different physical locations by one or more physical components. In some examples, the path loss component 515, or its sub-components, may be a separate and distinct component in accordance with various aspects of the present disclosure. In some examples, the path loss component 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
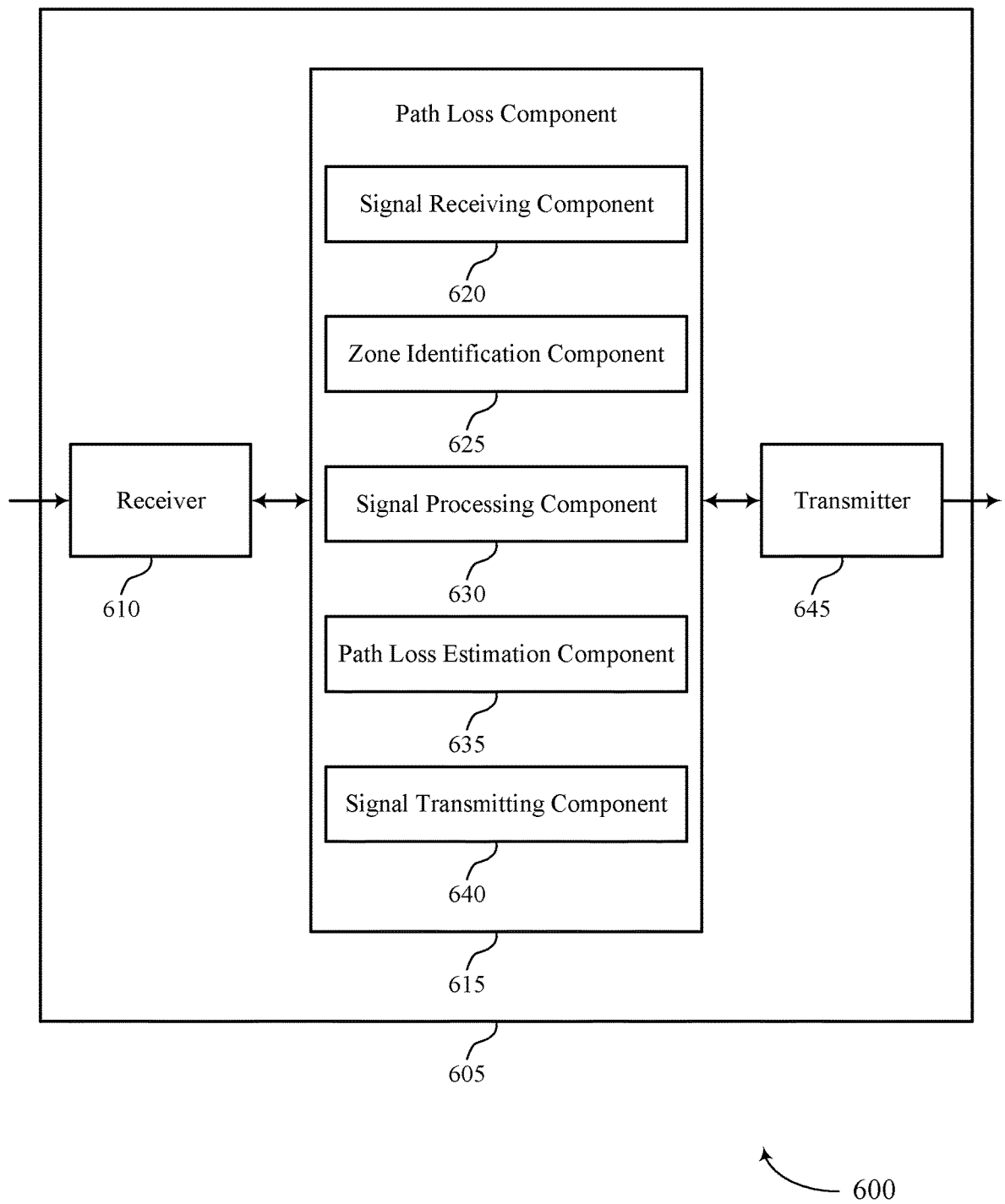

FIG. 6 shows a block diagram 600 of a device 605 that supports path loss estimation in accordance with aspects of the present disclosure. The device 605 may be an example of aspects of a device 505, or a UE 115 as described herein. The device 605 may include a receiver 610, a path loss component 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to path loss estimation, etc.). Information may be passed on to other components of the device 605. The receiver 610 may be an example of aspects of the transceiver 820 described with reference to FIG. 8. The receiver 610 may utilize a single antenna or a set of antennas.

The path loss component 615 may be an example of aspects of the path loss component 515 as described herein. The path loss component 615 may include a signal receiving component 620, a zone identification component 625, a signal processing component 630, a path loss estimation component 635, and a signal transmitting component 640. The path loss component 615 may be an example of aspects of the path loss component 810 described herein.

The signal receiving component 620 may receive, at a receiving wireless device in a first geographic zone, a set of signals from one or more transmitting wireless devices.

The zone identification component 625 may determine (e.g., identify), based on the set of signals, that the one or more transmitting wireless devices are in a second geographic zone. The zone identification component 625 may determine (e.g., identify), at a transmitting wireless device, a transmitting zone associated with a geographic location of the transmitting wireless device.

The signal processing component 630 may determine (e.g., identify) configured transmit power information for each of the set of signals from the one or more transmitting wireless devices that are in the second geographic zone.

The path loss estimation component 635 may estimate a path loss of wireless communications between the first geographic zone and the second geographic zone based on the configured transmit power information.

The signal transmitting component 640 may transmit to the second geographic zone using a configured transmit power based on the estimated path loss. The signal transmitting component 640 may configure a first set of transmit power parameters for a first set of signals to be transmitted from the transmitting wireless device, located in the transmitting zone, to a first set of receiving devices and transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof.

The transmitter 645 may transmit signals generated by other components of the device 605. In some examples, the transmitter 645 may be collocated with a receiver 610 in a transceiver component. For example, the transmitter 645 may be an example of aspects of the transceiver 820 described with reference to FIG. 8. The transmitter 645 may utilize a single antenna or a set of antennas.

Figure 7:
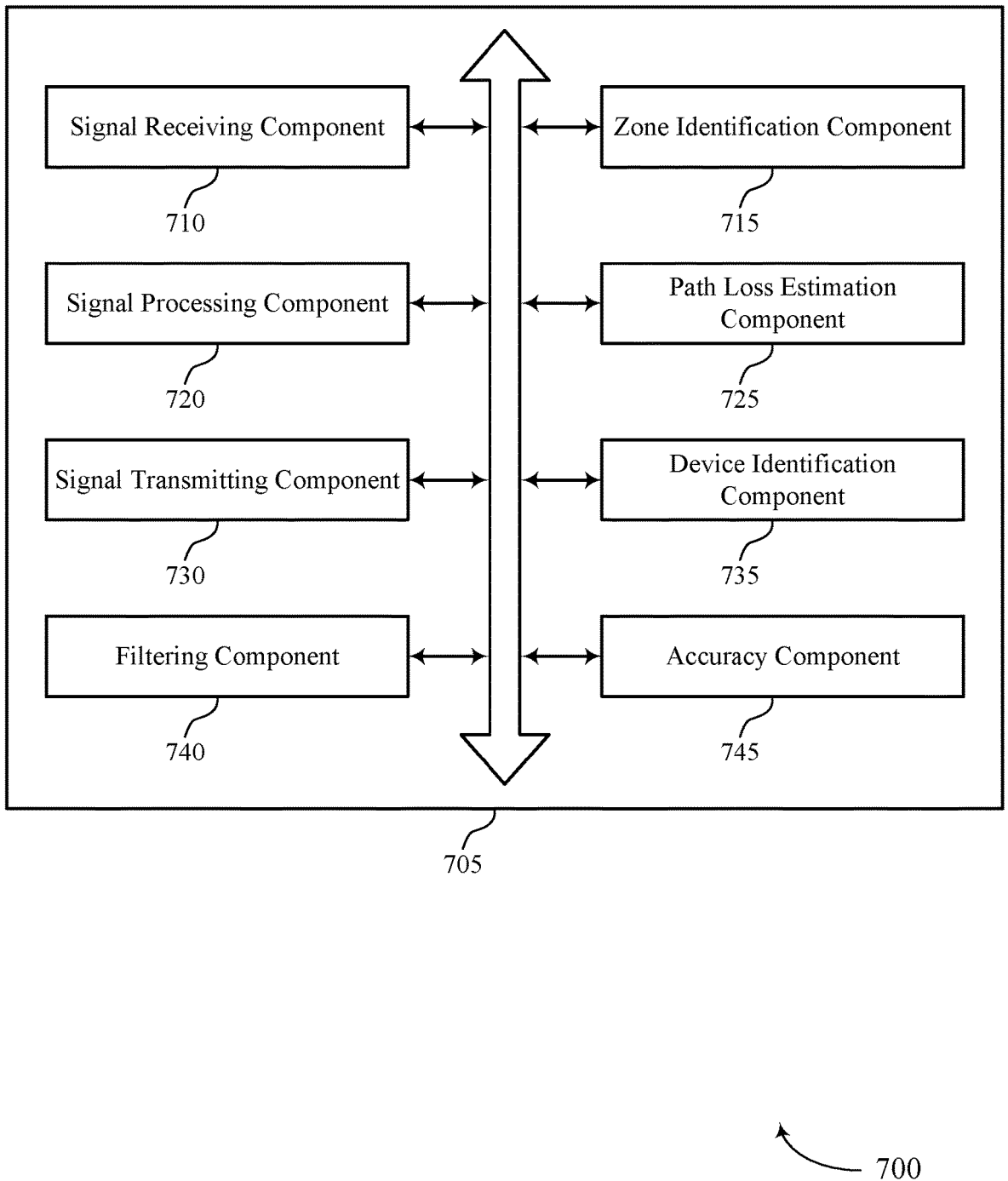
FIG. 7 shows a block diagram of a path loss component that supports path loss estimation in accordance with aspects of the present disclosure.

FIG. 7 shows a block diagram 700 of a path loss component 705 that supports path loss estimation in accordance with aspects of the present disclosure. The path loss component 705 may be an example of aspects of a path loss component 515, a path loss component 615, or a path loss component 810 described herein. The path loss component 705 may include a signal receiving component 710, a zone identification component 715, a signal processing component 720, a path loss estimation component 725, a signal transmitting component 730, a device identification component 735, a filtering component 740, and an accuracy component 745. Each of these components may communicate, directly or indirectly, with one another (e.g., via one or more buses).

The signal receiving component 710 may receive, at a receiving wireless device in a first geographic zone, a set of signals from one or more transmitting wireless devices. In some examples, the signal receiving component 710 may receive, from one or more other receiving devices located within the first geographic zone, path loss information for signals received at the one or more other receiving devices.

The device identification component 735 may determine (e.g., identify) a first set of signals received from a first transmitting wireless device of the one or more transmitting wireless devices. In some examples, the device identification component 735 may receive a transmitter identification within each of the set of signals, where each transmitter identification identifies one of the one or more transmitting wireless devices associated with one or more signals containing the transmitter identification.

The zone identification component 715 may determine (e.g., identify), based on the set of signals, that the one or more transmitting wireless devices are in a second geographic. In some examples, the zone identification component 715 may determine (e.g., identify), at a transmitting wireless device, a transmitting zone associated with a geographic location of the transmitting wireless device. In some examples, the zone identification component 715 may receive a zone identification within the set of signals from the one or more transmitting wireless devices. In some examples, the zone identification component 715 may determine (e.g., identify) that the one or more transmitting wireless devices are in the second geographic zone based on the zone identification. In some examples, the zone identification component 715 may determine (e.g., identify) that the one or more transmitting wireless devices are in the second geographic zone based on comparing the transmitter identification with location information received in one or more transmitter state information messages. In some examples, the zone identification component 715 may determine (e.g., identify), at the transmitting device, a second transmitting zone associated with a second geographic location of the transmitting wireless device. In some aspects, the one or more transmitter state information messages includes vehicle safety state information, the vehicle safety state information including a zone identification, a geographic location or a combination thereof.

In some aspects, the transmitting zone has a set geographic relation to a receiving zone associated with at least one of the one or more receiving devices.

The signal processing component 720 may determine (e.g., identify) configured transmit power information for each of the set of signals from the one or more transmitting wireless devices that are in the second geographic zone. In some examples, the signal processing component 720 may determine reference signal received power (RSRP) information for each of the set of signals received by the receiving wireless device. In some examples, the signal processing component 720 may determine (e.g., identify) a second set of signals received from a second transmitting wireless device of the one or more transmitting wireless devices. In some examples, the signal processing component 720 may determine (e.g., identify) a number of signals received from each of a set of transmitting wireless devices. In some examples, the signal processing component 720 may determine (e.g., identify) configured transmit power information for each of the set of signals based on receiving a configured transmit power indication in each of the set of signals. In some examples, the signal processing component 720 may determine (e.g., identify) the configured transmit power for each of the set of signals is based at least on part on a resource allocation, modulation coding scheme (MCS), congestion level, or combination thereof.

The path loss estimation component 725 may estimate a path loss of wireless communications between the first geographic zone and the second geographic zone based on the configured transmit power information. In some examples, the path loss estimation component 725 may calculate the estimated path loss between the first and second geographic zones based on comparing the RSRP information and the configured transmit power information. In some examples, the path loss estimation component 725 may determine an average path loss for the first set of signals. In some examples, the path loss estimation component 725 may calculate the estimated path loss between the first and second geographic zones based on determining the average path loss for the first transmitting wireless device. In some examples, the path loss estimation component 725 may estimate a device-to-device path loss for each of the set of transmitting wireless devices based on the number of signals received from each of the set of transmitting wireless devices. In some examples, the path loss estimation component 725 may estimate the path loss between the first and second geographic zones is based on a weighted average of the estimated device-to-device path losses for each of the set of transmitting wireless devices. In some examples, the path loss estimation component 725 may estimate the path loss between the first and second geographic zones is based on a weighted median of the estimated device-to-device path losses for each of the set of transmitting wireless devices. In some examples, the path loss estimation component 725 may calculate the estimated the path loss between the first and second geographic zones based on the configured transmit power information, the path loss information from the one or more other receiving devices or a combination thereof.

The filtering component 740 may filter one or more signals from the second set of signals based on reference signal received power (RSRP) information, configured transmit power information or a combination thereof. In some examples, the filtering component 740 may filter one or more signals received from a first transmitting wireless device based on comparing the one or more signals with the estimated device path loss associated with the first transmitting wireless device.

The accuracy component 745 may determine (e.g., identify) an accuracy requirement associated with a time window for receiving a set of signals from the second geographic zone. In some examples, the accuracy component 745 may determine whether the estimated path loss for the set of signals received within the time window meets the accuracy requirement.

The signal transmitting component 730 may transmit to the second geographic zone based on the estimated path loss. In some examples, the signal transmitting component 730 may configure a first set of transmit power parameters for a first set of signals to be transmitted from the transmitting wireless device, located in the transmitting zone, to a first set of receiving devices. In some examples, the signal transmitting component 730 may transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof. In some examples, the signal transmitting component 730 may configure a second set of transmit power parameters for a second set of signals to be transmitted from the transmitting wireless device, located in the second transmitting zone, to a second set of receiving devices. In some examples, the signal transmitting component 730 may transmit, from the second transmitting zone, the second set of signals to the second set of receiving devices, where the second set of signals include a transmitting wireless device identification, second configured transmit power information based on the second set of transmit power parameters, a second zone identification associated with the second transmitting zone, or a combination thereof.

Figure 8:
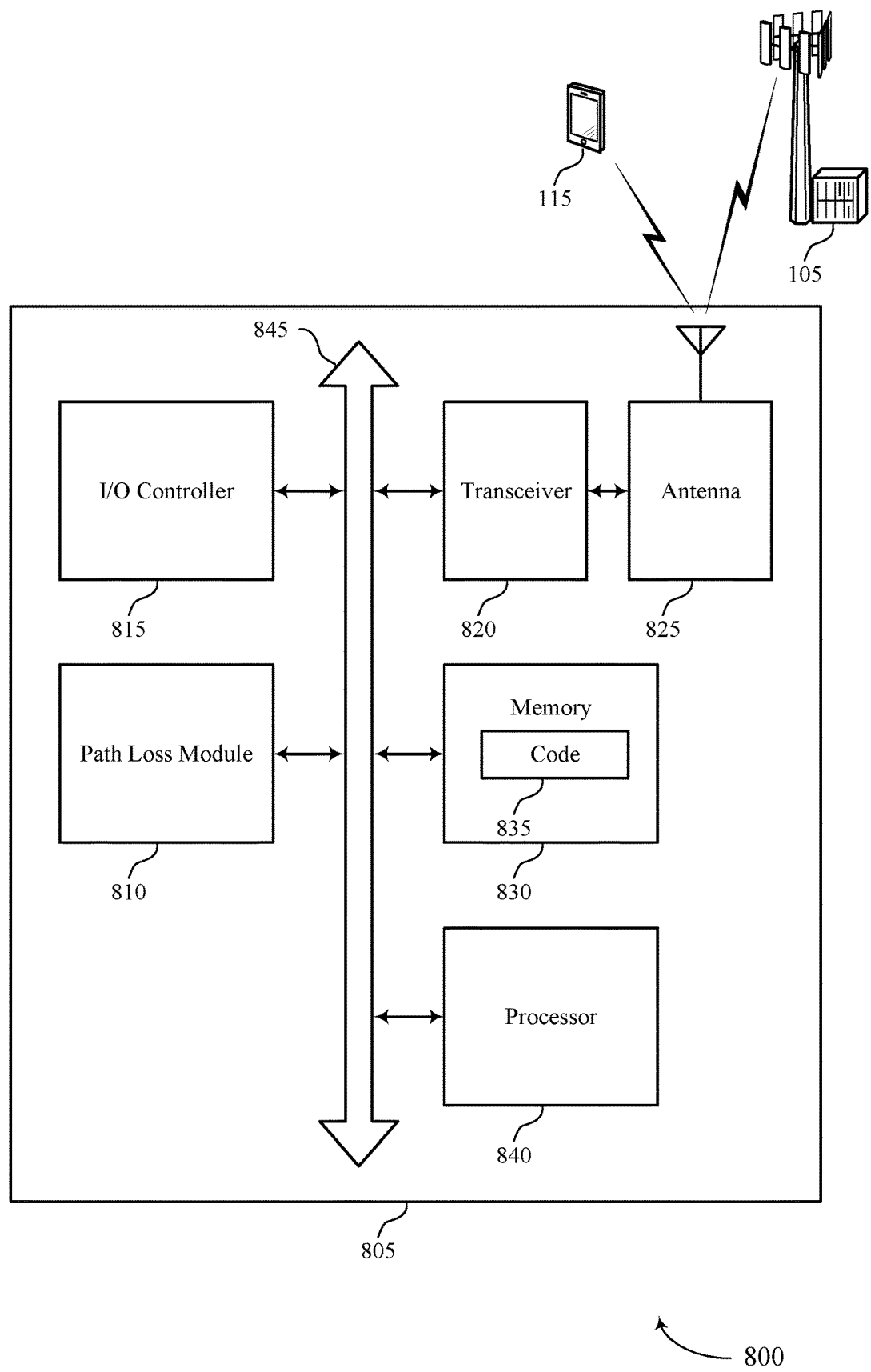
FIG. 8 shows a diagram of a system including a device that supports path loss estimation in accordance with aspects of the present disclosure.

FIG. 8 shows a diagram of a system 800 including a device 805 that supports path loss estimation in accordance with aspects of the present disclosure. The device 805 may be an example of or include the components of device 505, device 605, or a UE 115 as described herein. The device 805 may include components for bi-directional voice and data communications including components for transmitting and receiving communications, including a path loss component 810, an I/O controller 815, a transceiver 820, an antenna 825, memory 830, and a processor 840. These components may be in electronic communication via one or more buses (e.g., bus 845).

The path loss component 810 may receive, at a receiving wireless device in a first geographic zone, a set of signals from one or more transmitting wireless devices, determine (e.g., identify), based on the set of signals, that the one or more transmitting wireless devices are in a second geographic zone different from the first geographic zone, determine (e.g., identify) configured transmit power information for each of the set of signals from the one or more transmitting wireless devices that are in the second geographic zone, estimate a path loss of wireless communications between the first geographic zone and the second geographic zone based on the configured transmit power information, and transmit to the second geographic zone based on the estimated path loss. The path loss component 810 may determine (e.g., identify), at a transmitting wireless device, a transmitting zone associated with a geographic location of the transmitting wireless device, configure a first set of transmit power parameters for a first set of signals to be transmitted from the transmitting wireless device, located in the transmitting zone, to a first set of receiving devices, and transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting path loss estimation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
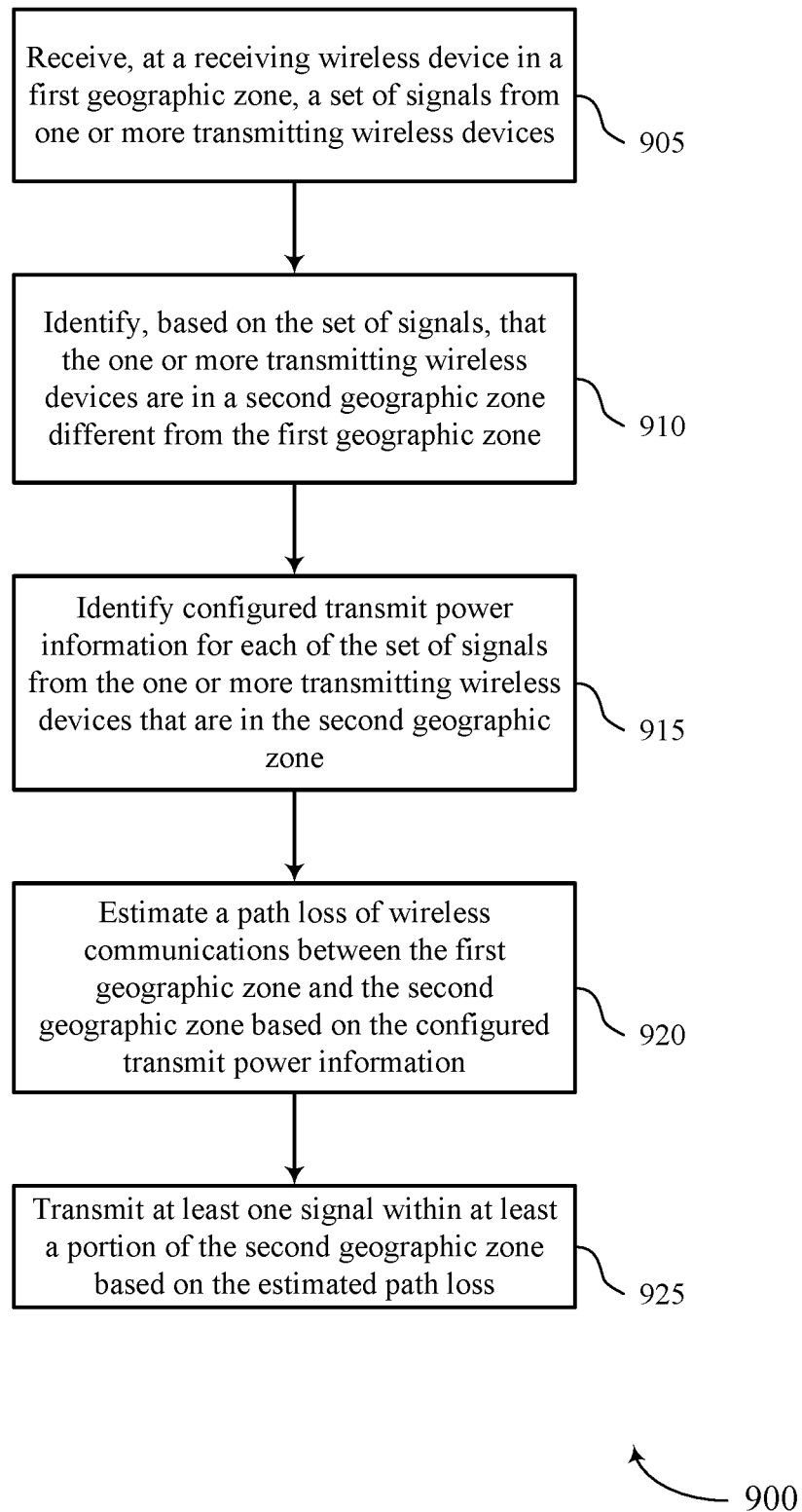
FIGS. 9 through 12 show flowcharts illustrating methods that support path loss estimation in accordance with aspects of the present disclosure.

FIG. 9 shows a flowchart illustrating a method 900 that supports path loss estimation in accordance with aspects of the present disclosure. The operations of method 900 may be implemented by a UE 115 or its components as described herein. For example, the operations of method 900 may be performed by a path loss component as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may receive, at a receiving wireless device in a first geographic zone, a set of signals from one or more transmitting wireless devices. The operations of 905 may be performed according to the methods described herein. In some examples, aspects of the operations of 905 may be performed by a signal receiving component as described with reference to FIGS. 5 through 8.

At 910, the UE may determine (e.g., identify), based on the set of signals, that the one or more transmitting wireless devices are in a second geographic zone. The operations of 910 may be performed according to the methods described herein. In some examples, aspects of the operations of 910 may be performed by a zone identification component as described with reference to FIGS. 5 through 8.

At 915, the UE may determine (e.g., identify) configured transmit power information for each of the set of signals from the one or more transmitting wireless devices that are in the second geographic zone. The operations of 915 may be performed according to the methods described herein. In some examples, aspects of the operations of 915 may be performed by a signal processing component as described with reference to FIGS. 5 through 8.

At 920, the UE may estimate a path loss of wireless communications between the first geographic zone and the second geographic zone based on the configured transmit power information. The operations of 920 may be performed according to the methods described herein. In some examples, aspects of the operations of 920 may be performed by a path loss estimation component as described with reference to FIGS. 5 through 8.

At 925, the UE may transmit at least one signal within at least a portion of the second geographic zone based at least in part on the estimated path loss. The operations of 925 may be performed according to the methods described herein. In some examples, aspects of the operations of 925 may be performed by a signal transmitting component as described with reference to FIGS. 5 through 8.

Figure 10:
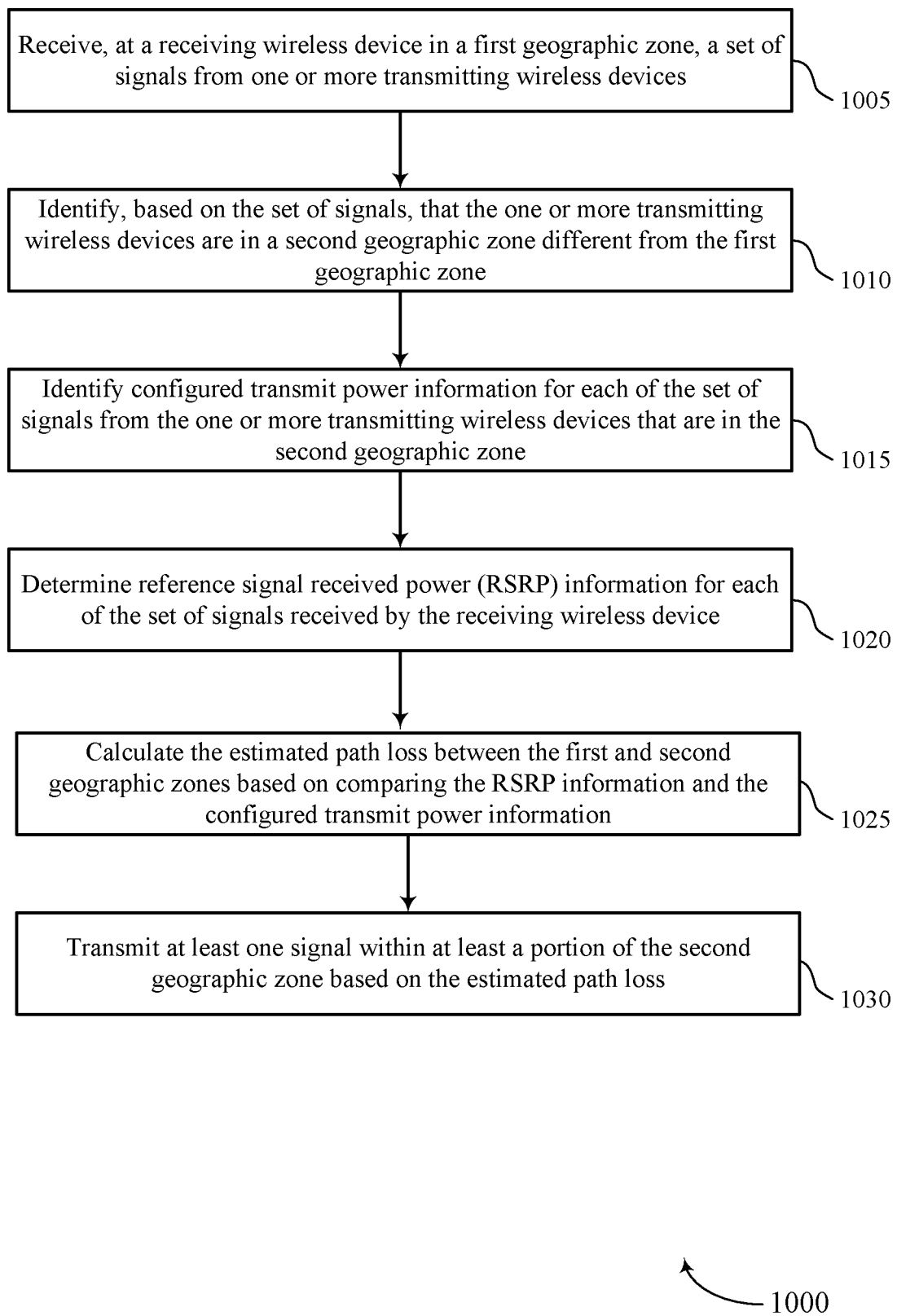

FIG. 10 shows a flowchart illustrating a method 1000 that supports path loss estimation in accordance with aspects of the present disclosure. The operations of method 1000 may be implemented by a UE 115 or its components as described herein. For example, the operations of method 1000 may be performed by a path loss component as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may receive, at a receiving wireless device in a first geographic zone, a set of signals from one or more transmitting wireless devices. The operations of 1005 may be performed according to the methods described herein. In some examples, aspects of the operations of 1005 may be performed by a signal receiving component as described with reference to FIGS. 5 through 8.

At 1010, the UE may determine (e.g., identify), based on the set of signals, that the one or more transmitting wireless devices are in a second geographic. The operations of 1010 may be performed according to the methods described herein. In some examples, aspects of the operations of 1010 may be performed by a zone identification component as described with reference to FIGS. 5 through 8.

At 1015, the UE may determine (e.g., identify) configured transmit power information for each of the set of signals from the one or more transmitting wireless devices that are in the second geographic zone. The operations of 1015 may be performed according to the methods described herein. In some examples, aspects of the operations of 1015 may be performed by a signal processing component as described with reference to FIGS. 5 through 8.

At 1020, the UE may determine reference signal received power (RSRP) information for each of the set of signals received by the receiving wireless device. The operations of 1020 may be performed according to the methods described herein. In some examples, aspects of the operations of 1020 may be performed by a signal processing component as described with reference to FIGS. 5 through 8.

At 1025, the UE may calculate the estimated path loss between the first and second geographic zones based on comparing the RSRP information and the configured transmit power information. The operations of 1030 may be performed according to the methods described herein. In some examples, aspects of the operations of 1030 may be performed by a path loss estimation component as described with reference to FIGS. 5 through 8.

At 1030, the UE may transmit at least one signal within at least a portion of the second geographic zone based at least in part on the estimated path loss. The operations of 1035 may be performed according to the methods described herein. In some examples, aspects of the operations of 1035 may be performed by a signal transmitting component as described with reference to FIGS. 5 through 8.

Figure 11:
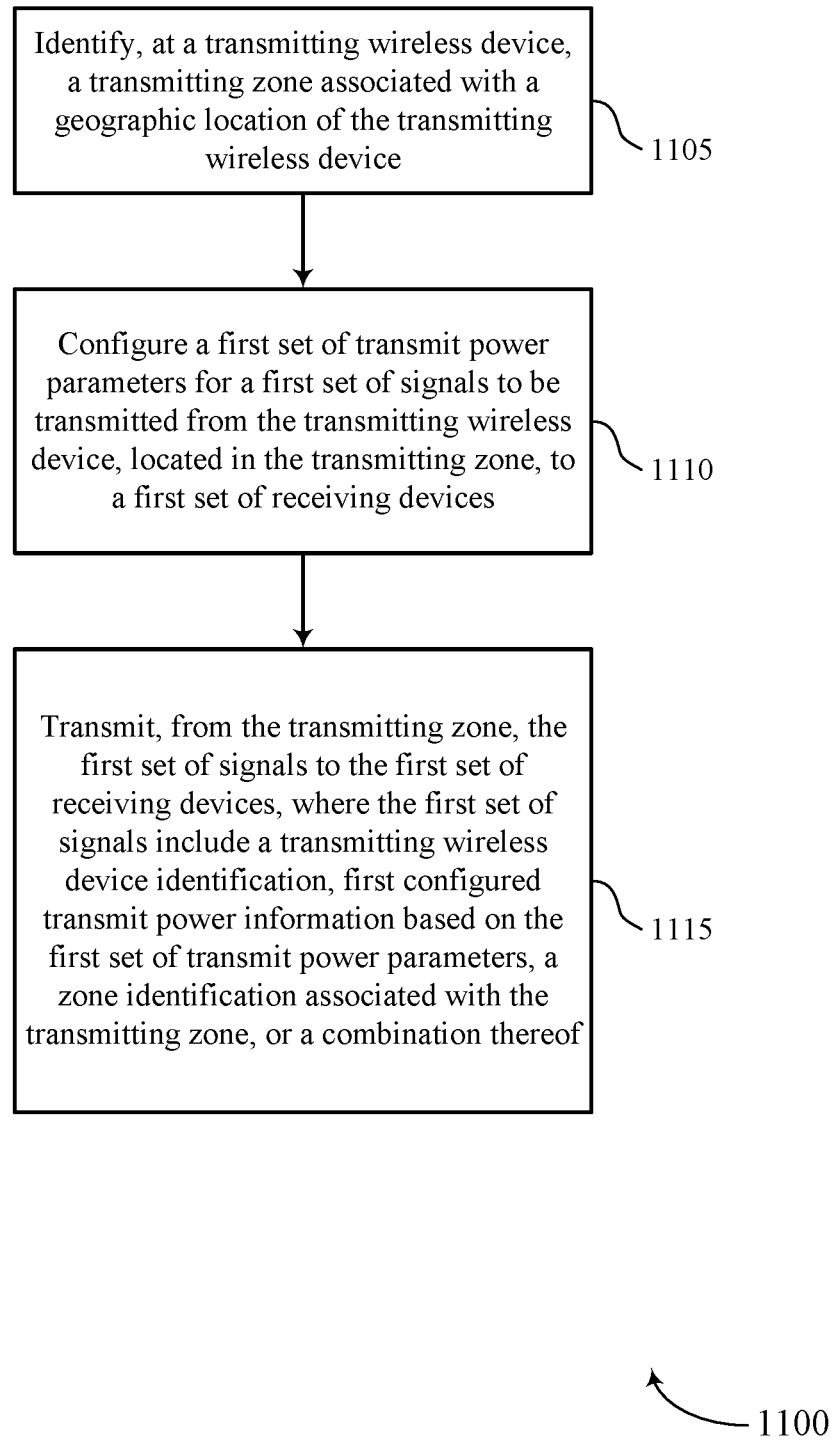

FIG. 11 shows a flowchart illustrating a method 1100 that supports path loss estimation in accordance with aspects of the present disclosure. The operations of method 1100 may be implemented by a UE 115 or its components as described herein. For example, the operations of method 1100 may be performed by a path loss component as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may determine (e.g., identify), at a transmitting wireless device, a transmitting zone associated with a geographic location of the transmitting wireless device. The operations of 1105 may be performed according to the methods described herein. In some examples, aspects of the operations of 1105 may be performed by a zone identification component as described with reference to FIGS. 5 through 8.

At 1110, the UE may configure a first set of transmit power parameters for a first set of signals to be transmitted from the transmitting wireless device, located in the transmitting zone, to a first set of receiving devices. The operations of 1110 may be performed according to the methods described herein. In some examples, aspects of the operations of 1110 may be performed by a signal transmitting component as described with reference to FIGS. 5 through 8.

At 1115, the UE may transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof. The operations of 1115 may be performed according to the methods described herein. In some examples, aspects of the operations of 1115 may be performed by a signal transmitting component as described with reference to FIGS. 5 through 8.

Figure 12:
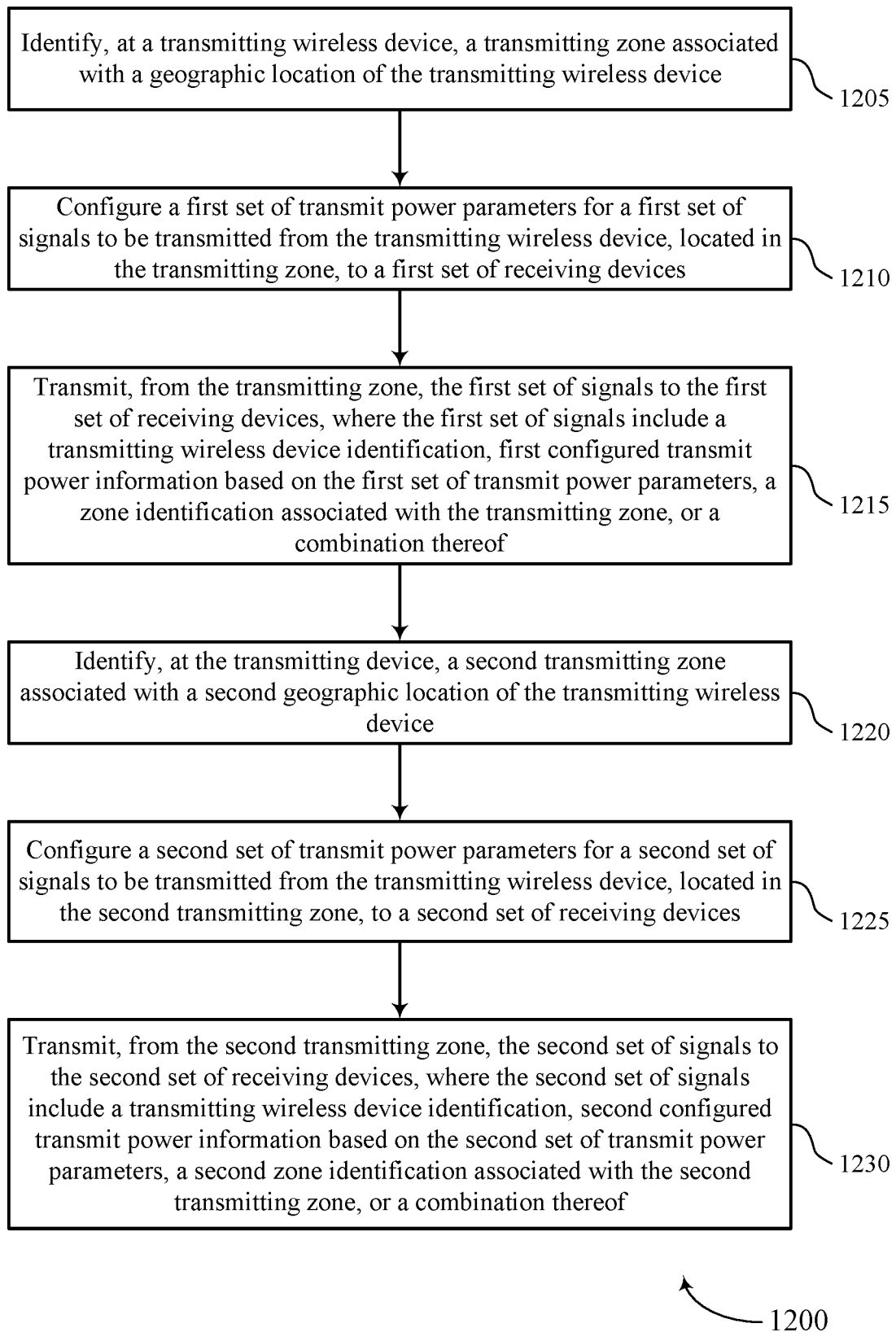

FIG. 12 shows a flowchart illustrating a method 1200 that supports path loss estimation in accordance with aspects of the present disclosure. The operations of method 1200 may be implemented by a UE 115 or its components as described herein. For example, the operations of method 1200 may be performed by a path loss component as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may determine (e.g., identify), at a transmitting wireless device, a transmitting zone associated with a geographic location of the transmitting wireless device. The operations of 1205 may be performed according to the methods described herein. In some examples, aspects of the operations of 1205 may be performed by a zone identification component as described with reference to FIGS. 5 through 8.

At 1210, the UE may configure a first set of transmit power parameters for a first set of signals to be transmitted from the transmitting wireless device, located in the transmitting zone, to a first set of receiving devices. The operations of 1210 may be performed according to the methods described herein. In some examples, aspects of the operations of 1210 may be performed by a signal transmitting component as described with reference to FIGS. 5 through 8.

At 1215, the UE may transmit, from the transmitting zone, the first set of signals to the first set of receiving devices, where the first set of signals include a transmitting wireless device identification, first configured transmit power information based on the first set of transmit power parameters, a zone identification associated with the transmitting zone, or a combination thereof. The operations of 1215 may be performed according to the methods described herein. In some examples, aspects of the operations of 1215 may be performed by a signal transmitting component as described with reference to FIGS. 5 through 8.

At 1220, the UE may determine (e.g., identify), at the transmitting device, a second transmitting zone associated with a second geographic location of the transmitting wireless device. The operations of 1220 may be performed according to the methods described herein. In some examples, aspects of the operations of 1220 may be performed by a zone identification component as described with reference to FIGS. 5 through 8.

At 1225, the UE may configure a second set of transmit power parameters for a second set of signals to be transmitted from the transmitting wireless device, located in the second transmitting zone, to a second set of receiving devices. The operations of 1225 may be performed according to the methods described herein. In some examples, aspects of the operations of 1225 may be performed by a signal transmitting component as described with reference to FIGS. 5 through 8.

At 1230, the UE may transmit, from the second transmitting zone, the second set of signals to the second set of receiving devices, where the second set of signals include a transmitting wireless device identification, second configured transmit power information based on the second set of transmit power parameters, a second zone identification associated with the second transmitting zone, or a combination thereof. The operations of 1230 may be performed according to the methods described herein. In some examples, aspects of the operations of 1230 may be performed by a signal transmitting component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   setting a first set of transmit power parameters for a first set of signals to be transmitted from a transmitting wireless device, located in a first transmitting zone associated with a geographic location of the transmitting wireless device, to a first set of receiving devices;
   transmitting, from the first transmitting zone, the first set of signals to the first set of receiving devices, wherein the first set of signals comprise a transmitting wireless device identification, first configured transmit power information based at least in part on the first set of transmit power parameters, and a first zone identification associated with the first transmitting zone, wherein the first zone identification indicates the first transmitting zone from a plurality of geographic zones, each geographic zone of the plurality of geographic zones having a defined geometric relationship to other geographic zones of the plurality of geographic zones;
   setting a second set of transmit power parameters for a second set of signals to be transmitted from the transmitting wireless device to a second set of receiving devices based at least in part on transitioning from the first transmitting zone to a second transmitting zone of the plurality of geographic zones; and
   transmitting, from the second transmitting zone, the second set of signals to the second set of receiving devices, wherein the second set of signals comprise the transmitting wireless device identification, second configured transmit power information based at least in part on the second set of transmit power parameters, and a second zone identification associated with the second transmitting zone.

2. The method of claim 1, wherein the transmitting wireless device transitions from the first transmitting zone to the second transmitting zone after transmitting the first set of signals.

3. The method of claim 1, wherein at least one receiving device is a member of both the first set of receiving devices and the second set of receiving devices.

4. The method of claim 1, wherein the first set of signals, the second set of signals, or both, are transmitted via a unicast, a multicast, or a broadcast transmission method.

5. The method of claim 1, wherein the first transmitting zone has a set geographic relation to a first receiving zone associated with at least one receiving device of the first set of receiving devices and the second transmitting zone has a set geographic relation to a second receiving zone associated with at least one receiving device of the second set of receiving devices.

6. An apparatus for wireless communications, comprising:
   one or more memories storing processor-executable code; and
   one or more processors coupled with the one or more memories and individually or collectively operable to execute the code to cause the apparatus to:
   set a first set of transmit power parameters for a first set of signals to be transmitted from a transmitting wireless device, located in a first transmitting zone associated with a geographic location of the transmitting wireless device, to a first set of receiving devices;
   transmit, from the first transmitting zone, the first set of signals to the first set of receiving devices, wherein the first set of signals comprise a transmitting wireless device identification, first configured transmit power information based at least in part on the first set of transmit power parameters, and a first zone identification associated with the first transmitting zone, wherein the first zone identification indicates the first transmitting zone from a plurality of geographic zones, each geographic zone of the plurality of geographic zones having a defined geometric relationship to other geographic zones of the plurality of geographic zones;
   set a second set of transmit power parameters for a second set of signals to be transmitted from the transmitting wireless device to a second set of receiving devices based at least in part on transitioning from the first transmitting zone to a second transmitting zone of the plurality of geographic zones; and
   transmit, from the second transmitting zone, the second set of signals to the second set of receiving devices, wherein the second set of signals comprise the transmitting wireless device identification, second configured transmit power information based at least in part on the second set of transmit power parameters, and a second zone identification associated with the second transmitting zone.

7. The apparatus of claim 6, wherein the transmitting wireless device transitions from the first transmitting zone to the second transmitting zone after transmitting the first set of signals.

8. The apparatus of claim 6, wherein at least one receiving device is a member of both the first set of receiving devices and the second set of receiving devices.

9. The apparatus of claim 6, wherein the first set of signals, the second set of signals, or both, are transmitted via a unicast, a multicast, or a broadcast transmission method.

10. The apparatus of claim 6, wherein the first transmitting zone has a set geographic relation to a first receiving zone associated with at least one receiving device of the first set of receiving devices and the second transmitting zone has a set geographic relation to a second receiving zone associated with at least one receiving device of the second set of receiving devices.

11. An apparatus for wireless communications, comprising:
   means for setting a first set of transmit power parameters for a first set of signals to be transmitted from a transmitting wireless device, located in a first transmitting zone associated with a geographic location of the transmitting wireless device, to a first set of receiving devices;
   means for transmitting, from the first transmitting zone, the first set of signals to the first set of receiving devices, wherein the first set of signals comprise a transmitting wireless device identification, first configured transmit power information based at least in part on the first set of transmit power parameters, and a first zone identification associated with the first transmitting zone, wherein the first zone identification indicates the first transmitting zone from a plurality of geographic zones, each geographic zone of the plurality of geographic zones having a defined geometric relationship to other geographic zones of the plurality of geographic zones;
   means for setting a second set of transmit power parameters for a second set of signals to be transmitted from the transmitting wireless device to a second set of receiving devices based at least in part on transitioning from the first transmitting zone to a second transmitting zone of the plurality of geographic zones; and
   means for transmitting, from the second transmitting zone, the second set of signals to the second set of receiving devices, wherein the second set of signals comprise the transmitting wireless device identification, second configured transmit power information based at least in part on the second set of transmit power parameters, and a second zone identification associated with the second transmitting zone.

12. The apparatus of claim 11, wherein the transmitting wireless device transitions from the first transmitting zone to the second transmitting zone after transmitting the first set of signals.

13. The apparatus of claim 11, wherein at least one receiving device is a member of both the first set of receiving devices and the second set of receiving devices.

14. The apparatus of claim 11, wherein the first set of signals, the second set of signals, or both, are transmitted via a unicast, a multicast, or a broadcast transmission method.

15. The apparatus of claim 11, wherein the first transmitting zone has a set geographic relation to a first receiving zone associated with at least one receiving device of the first set of receiving devices and the second transmitting zone has a set geographic relation to a second receiving zone associated with at least one receiving device of the second set of receiving devices.

16. A non-transitory computer-readable medium storing code for wireless communications, the code comprising instructions executable by one or more processors to:
   set a first set of transmit power parameters for a first set of signals to be transmitted from a transmitting wireless device, located in a first transmitting zone associated with a geographic location of the transmitting wireless device, to a first set of receiving devices;
   transmit, from the first transmitting zone, the first set of signals to the first set of receiving devices, wherein the first set of signals comprise a transmitting wireless device identification, first configured transmit power information based at least in part on the first set of transmit power parameters, and a first zone identification associated with the first transmitting zone, wherein the first zone identification indicates the first transmitting zone from a plurality of geographic zones, each geographic zone of the plurality of geographic zones having a defined geometric relationship to other geographic zones of the plurality of geographic zones;
   set a second set of transmit power parameters for a second set of signals to be transmitted from the transmitting wireless device to a second set of receiving devices based at least in part on transitioning from the first transmitting zone to a second transmitting zone of the plurality of geographic zones; and
   transmit, from the second transmitting zone, the second set of signals to the second set of receiving devices, wherein the second set of signals comprise the transmitting wireless device identification, second configured transmit power information based at least in part on the second set of transmit power parameters, and a second zone identification associated with the second transmitting zone.

17. The non-transitory computer-readable medium of claim 16, wherein the transmitting wireless device transitions from the first transmitting zone to the second transmitting zone after transmitting the first set of signals.

18. The non-transitory computer-readable medium of claim 16, wherein at least one receiving device is a member of both the first set of receiving devices and the second set of receiving devices.

19. The non-transitory computer-readable medium of claim 16, wherein the first set of signals, the second set of signals, or both, are transmitted via a unicast, a multicast, or a broadcast transmission method.

20. The non-transitory computer-readable medium of claim 16, wherein the first transmitting zone has a set geographic relation to a first receiving zone associated with at least one receiving device of the first set of receiving devices and the second transmitting zone has a set geographic relation to a second receiving zone associated with at least one receiving device of the second set of receiving devices.

* * * * *